US009915075B2

(12) United States Patent
Sirek et al.

(10) Patent No.: US 9,915,075 B2
(45) Date of Patent: *Mar. 13, 2018

(54) ADJUSTMENT DEVICE, SYSTEM AND METHODS

(71) Applicants: Andy Sirek, Sarona, WI (US); Colton Sirek, Sarona, WI (US)

(72) Inventors: Andy Sirek, Sarona, WI (US); Colton Sirek, Sarona, WI (US)

( * ) Notice: Subject to any disclaimer, the term of this patent is extended or adjusted under 35 U.S.C. 154(b) by 263 days.

This patent is subject to a terminal disclaimer.

(21) Appl. No.: 14/590,365

(22) Filed: Jan. 6, 2015

(65) Prior Publication Data

US 2015/0113909 A1 Apr. 30, 2015

Related U.S. Application Data

(63) Continuation of application No. 13/104,628, filed on May 10, 2011, now Pat. No. 9,010,704, and a continuation of application No. 12/706,234, filed on Feb. 16, 2010, now abandoned.

(51) Int. Cl.

| | |
|---|---|
| ***F16M 13/02*** | (2006.01) |
| ***E04F 21/00*** | (2006.01) |
| ***E06B 1/04*** | (2006.01) |
| ***E06B 1/60*** | (2006.01) |
| ***E06B 3/96*** | (2006.01) |

(52) U.S. Cl.

CPC ............ *E04F 21/0015* (2013.01); *E06B 1/04* (2013.01); *E06B 1/6015* (2013.01); *E06B 1/6046* (2013.01); *E06B 3/96* (2013.01)

(58) Field of Classification Search

CPC .......... E04F 21/0015; E06B 3/96; E06B 1/04; E06B 1/6046; E06B 1/6015

USPC ......... 248/544, 208, 222.14, 225.11, 231.21, 248/231.85, 316.1, 495, 220.22; 52/204.1, 204.56, 213; 49/505, 126.1; 33/194

See application file for complete search history.

(56) References Cited

U.S. PATENT DOCUMENTS 3,230,632 A * 1/1966 Redding ............. E04G 21/1841 33/372
3,960,350 A * 6/1976 Tardoskegyi ............. F16L 3/14 248/589
D252,255 S * 7/1979 Uyeda ............................ D8/394
6,261,037 B1 * 7/2001 Richards ............... F16L 3/2235 410/36
6,722,643 B1 * 4/2004 Kurtz ........................ B25B 5/10 269/249

(Continued)

*Primary Examiner* — Tan Le
(74) *Attorney, Agent, or Firm* — Anthony J. Bourget

(57) ABSTRACT

An alignment device, systems and methods where the device includes a guide, a support and a connector which engages the guide and the support. The guide may be a relatively flat piece attachable to and edge of a frame for framing a window or a door. In one aspect the guide member a slot, support attaches to an object such as a window or a door (or is integral with an object such as a window or door) which is to be aligned with the frame. The connector threads within a hole associated with the object, such as a hole of a support connected to a jamb of a window. The connector engages a slot of the guide and the device allows for desired alignment of an object within a frame by transferring rotational movement to linear movement.

18 Claims, 22 Drawing Sheets

(56) References Cited

U.S. PATENT DOCUMENTS 6,863,248 B2 * 3/2005 Calais ....................... F16L 3/02
248/49

* cited by examiner

ADJUSTMENT DEVICE, SYSTEM AND METHODS

The present application is a continuation-in-part of, and claims priority to, co-pending U.S. patent application Ser. No. 13/104,628, filed on May 10, 2011, which is a continuation-in-part of, and claims priority to, co-pending U.S. patent application Ser. No. 12/706,234, filed on Feb. 16, 2010, both of which are hereby incorporated by reference as if fully reproduced herein.

BACKGROUND OF THE INVENTION

1. Field of the Invention

This invention is generally directed to an adjustment device. More particularly, the invention is directed to a device for adjusting objects within a frame.

2. Background Information

Doors and windows have been installed in buildings and structures since the invention of buildings and structures and the like. Sometimes the convention of installing doors or windows or other objects in structures includes guesswork as to where to rigidly set a door or a window or other object with respect to a frame structure.

In a relatively recent development, tools have been used to assist in aligning a door or window or other object within a frame structure. These tools generally require alignment and direct engagement of multiple pieces of the tool to precisely align an object within its frame structure.

SUMMARY OF THE INVENTION

Although tools exist that may be used in the alignment of a door or window or extension jamb or other object within a frame structure, the inventors have realized improvements thereon. The inventors have realized the existing tools require relatively long manufacturing times due to precise machining operations, long installation times due to particular interactions of the known tools and high raw material costs due to numerous tool parts. The inventors have realized that these detriments of existing window or door or extension jamb alignment tools are unneeded and undesirable in a tool. The inventors have developed a novel tool having low manufacturing times, low raw material costs and low production costs due at least to the use of simple parts that require minimal precision machining. Further, the inventive tool may also have low installation times due at least to simple interactions of the tool parts.

Generally, an embodiment of the invention includes an insert adjuster that comprises a guide member, a support member, a connector and attaching members. The guide member may be a relatively flat piece that may be attached to a structure frame. In one aspect the support member may have a first portion orthogonal to a second portion and the first portion may be attached to a window or door or extension jamb or other object. The second portion may have a connector portion for receiving and engaging a connector. The connector may also engage a slot or hole of the guide member.

The invention includes an adjusting device and system for adjusting an object, such as a window or door, with respect to a frame, the device including a guide having a slot and configured to connect to the frame, a support associated with the object and independent of the guide, and an elongated threaded connector having a head positioned at a terminal first end of the connector, an engaging piece where the head and the engaging piece are separated by a neck, and a second end of the connector configured to connect to the support, the guide configured such that the neck is capable of being inserted into the guide after the connector is connected to the support, and where rotation of the connector about a central longitudinal axis of the connector changes a distance between the guide and the support.

The invention includes a method of adjusting an object such as a window or a door with respect to a frame where a threaded connector is threaded within a threaded hole associated with the object and the frame includes a guide, the method including inserting the threaded connector into the guide after the threaded connector is positioned within the threaded hole, and rotating the connector about a central longitudinal axis of the connector to change a distance between the guide and the support where clockwise rotation of the connector reduces or increases the distance between the guide and the support and where counterclockwise rotation increases or reduces the distance between the guide and the support.

The invention includes an adjustment system for adjusting a window or door jamb within a framed opening having at least one frame, the system includes a support configured to connect to the jamb, a guide having a slot and configured to connect to the at least one frame, and an elongated threaded connector having a central longitudinal axis and having a neck separating a head from an engaging piece, the neck having a diameter less than a diameter of the head and of the engaging piece, the head positioned at a terminal end of the connector, the neck configured to insert within the slot by sliding the connector in a direction transverse the longitudinal axis, the connector configured to threadably engaging the support where rotation of the connector about the longitudinal axis provides linear movement of the support with respect to the guide. Such transverse movement allows for ease of connection of the connector to the guide and further allows the connector to be connected to the jamb or support prior to connecting the connector to the guide.

An object of the invention is to provide a tool that may be used to easily align a window or door or other object within a frame structure. Simple or easy alignment may include a tool that requires limited direct interaction between tool parts.

An object of the invention is to provide a tool that may be manufactured using simple material processing methods that are common and, generally, efficient. Such processing may including punching, lathing and other similar processes.

An object of the invention is to provide a tool that may be easily attached to a window or door or jamb extension and the corresponding frame structure. Such easy attachment may be facilitated, at least, because the guide member and support member may not be required to directly engage each other.

A further object of the invention is to provide a tool or tool system that may be at least partially attached to a window or door or other object during the manufacturing of the window or door or other object, and thus, the tool may be distributed with the door or window or other object.

A further object of the invention is to provide a tool that may be distributed as a kit, which has a low cost due to low raw material costs, low manufacturing times and other low cost considerations.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
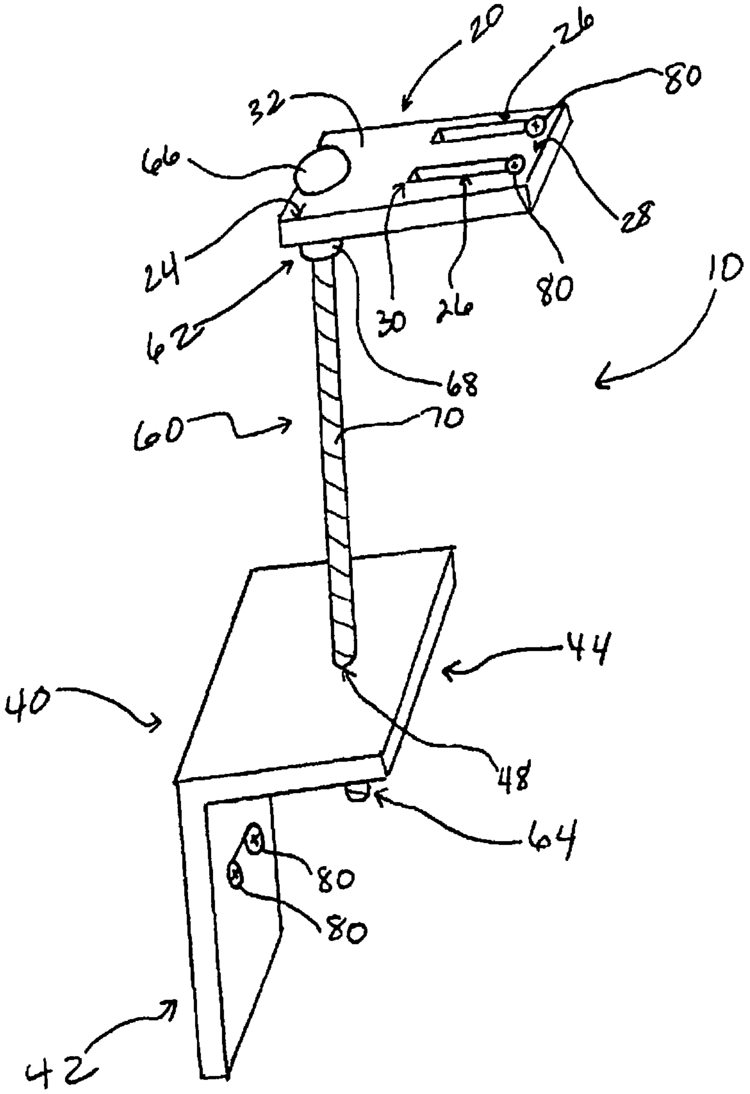
FIG. 1 is a perspective view of an embodiment of the invention.

While the invention is amenable to various modifications and alternative forms, specifics thereof have been shown by way of example in the drawings and will be described in detail. It should be understood, however, that the intention is not necessarily to limit the invention of the particular embodiments described. On the contrary, the intention is to cover all modifications, equivalents, and alternatives falling within the spirit and scope of the invention and as defined by the appended claims.

DETAILED DESCRIPTION OF THE INVENTION

The subject inventive adjustment device and methods of using the adjustment device may take on numerous physical and methodical embodiments within the spirit of the invention and only preferred embodiments have been described in detail below, which are not meant to limit the scope or spirit or both of the invention.

As shown in FIGS. 1-26, adjuster 10 may comprise guide 20, support 40 and connector 60. Guide 20 and support 40 may be independent of one another, which may mean they do not engage or interact directly except through connector 60. Further, adjuster 10 may also include attaching members 80. Attaching members 80 (of the same or differing sizes) may be utilized for attaching guide 20 to a frame 100 of a building or structure or other object; and for attaching support 40 to an extension jamb 120 of a door or window or other insert. Sometimes frame 100 (See FIG. 8, for instance) is referred to as a “trimmer” such as in the case of installing a window. Sometimes extension jamb 120 is referred to simply as a “jamb” of a window or a door. Attaching members 80 may be screws or nails or other known attaching mechanisms. When adjuster 10 is attached to a frame 100 and an extension jamb 120, the device 10 may operate by transferring rotational motion of connector 40 to linear motion of extension jamb 120 with respect to frame 100, or vice versa, allowing for precise adjustment of a window or door with respect to a frame or an object attached to a frame. Further, all parts of adjuster 10 may be made out of the same or different material. Any material may be used to make adjuster 10; for example, plastics, steel, aluminum, etc. may be used to make adjuster 10. Yet further, the parts of adjuster 10 may be formed by simple mechanical processes including, but not limited to lathing, forming, bending, stamping, punching and other similar mechanical processes.

In one aspect, guide 20 is connected to a frame 100 and a support 40 is connected to a jamb 120 or jamb extension of a window 150 or a door. A connector 60 connects support 40 to the guide 20. Connector 60 first connects to support 40 and then inserts into a slot 22 of guide 20 as described herein. Connector 60 is rotated which causes jamb 120 to translate with respect to frame 100.

A. Guide

Figure 2:
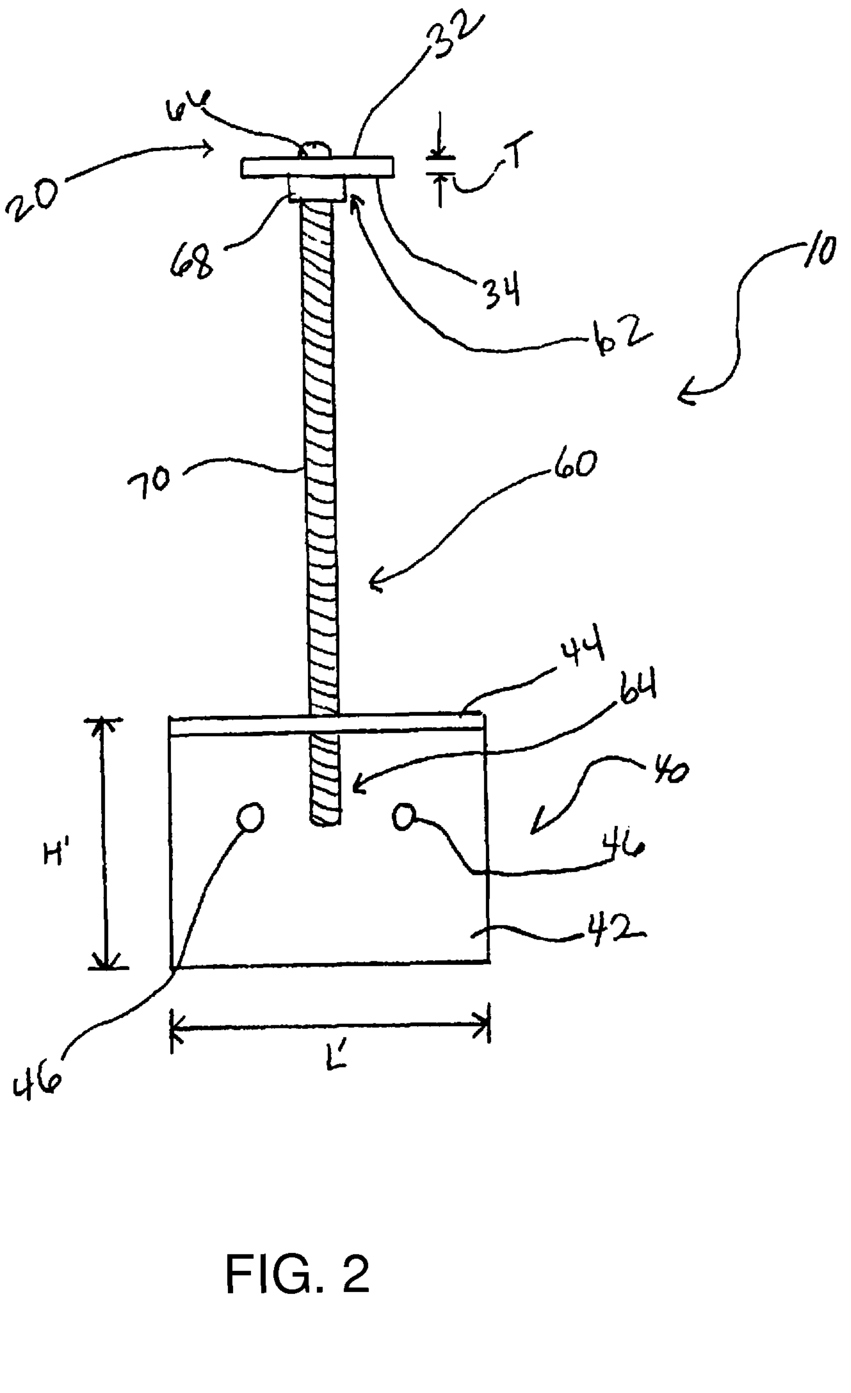
FIG. 2 is a rear view of the embodiment of the invention in FIG. 1.
Figure 3:
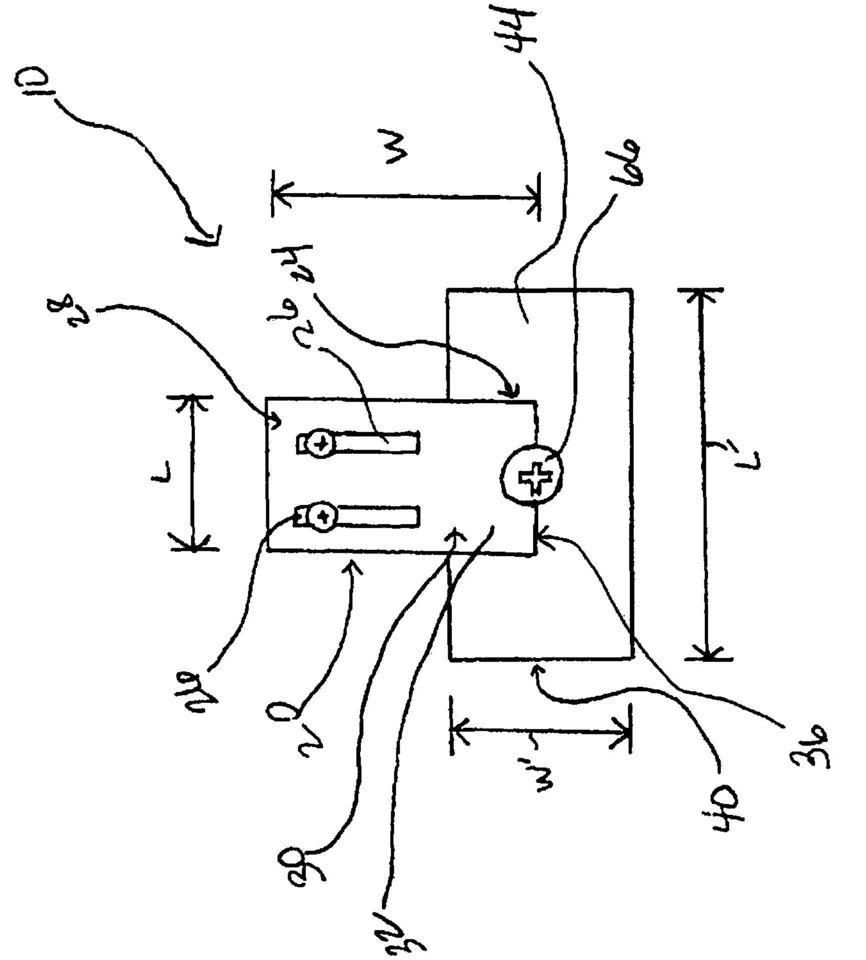
FIG. 3 is a top plan view of the embodiment of the invention in FIG. 1.
Figure 4:
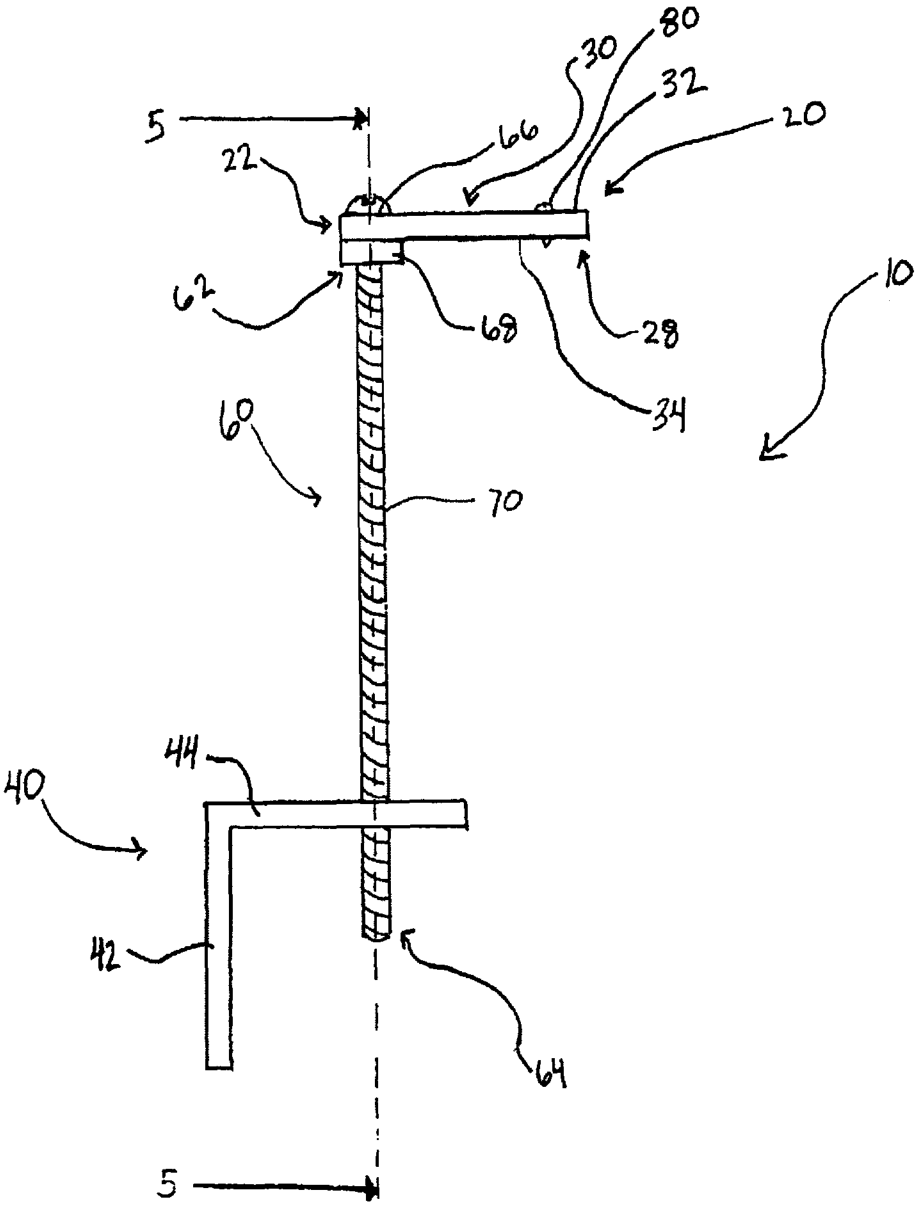
FIG. 4 is a side view of the embodiment of the invention in FIG. 1.
Figure 8:
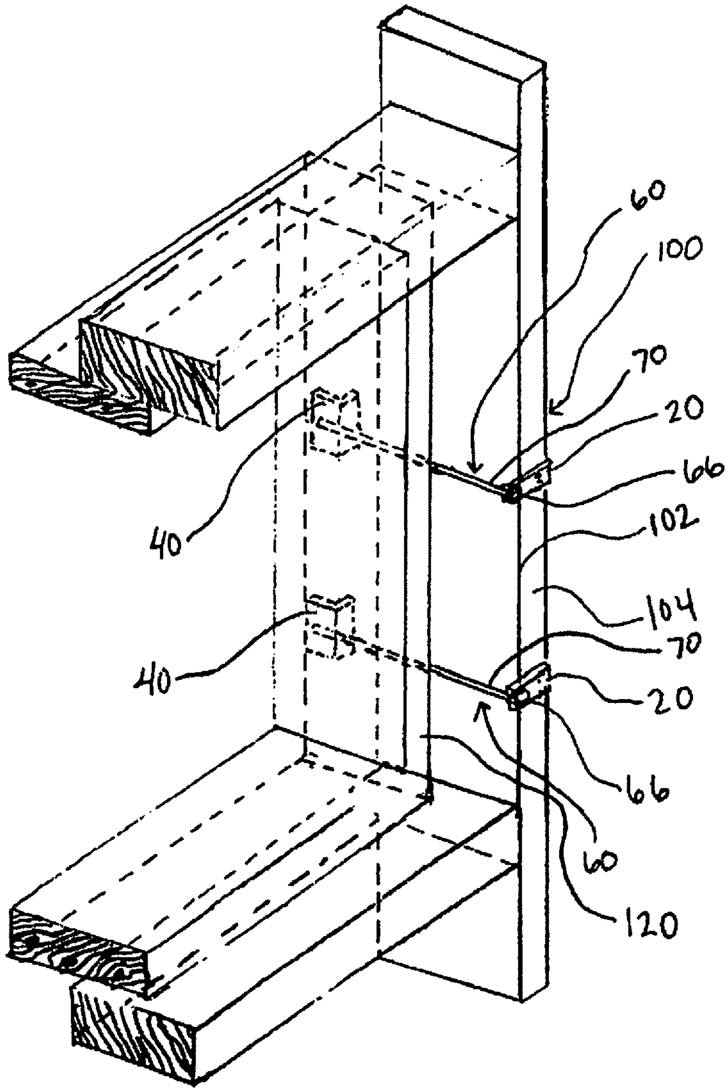
FIG. 8 is a perspective view of the embodiment of the invention of FIG. 1 in use and in a first position.
Figure 9:
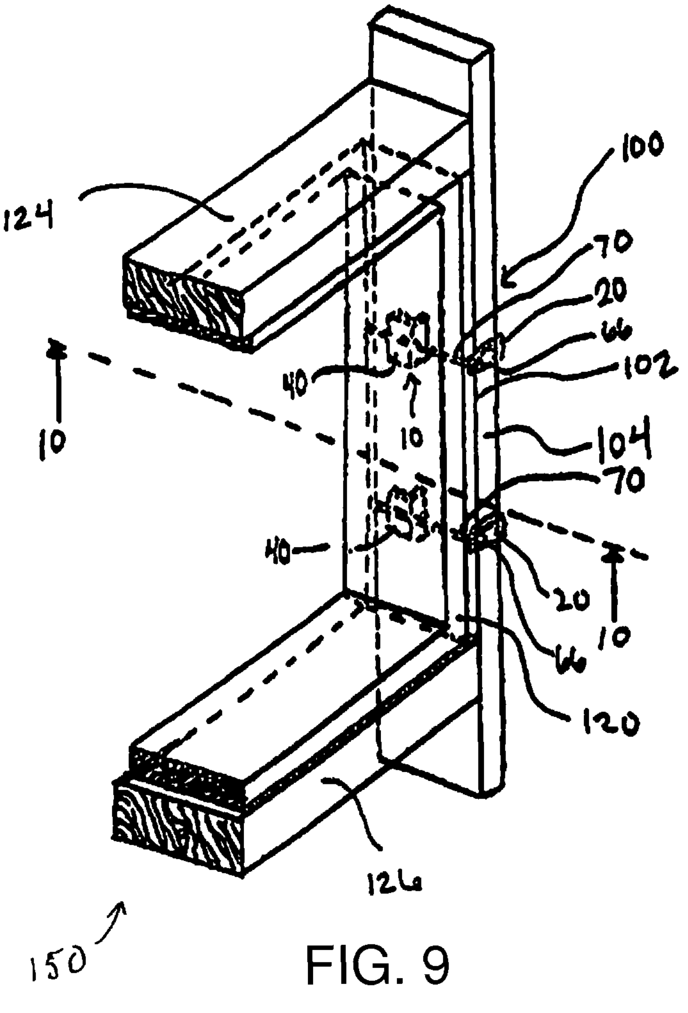
FIG. 9 is a perspective view of the embodiment of the invention of FIG. 1 in use and in a second position with respect to FIG. 8.
Figure 10:
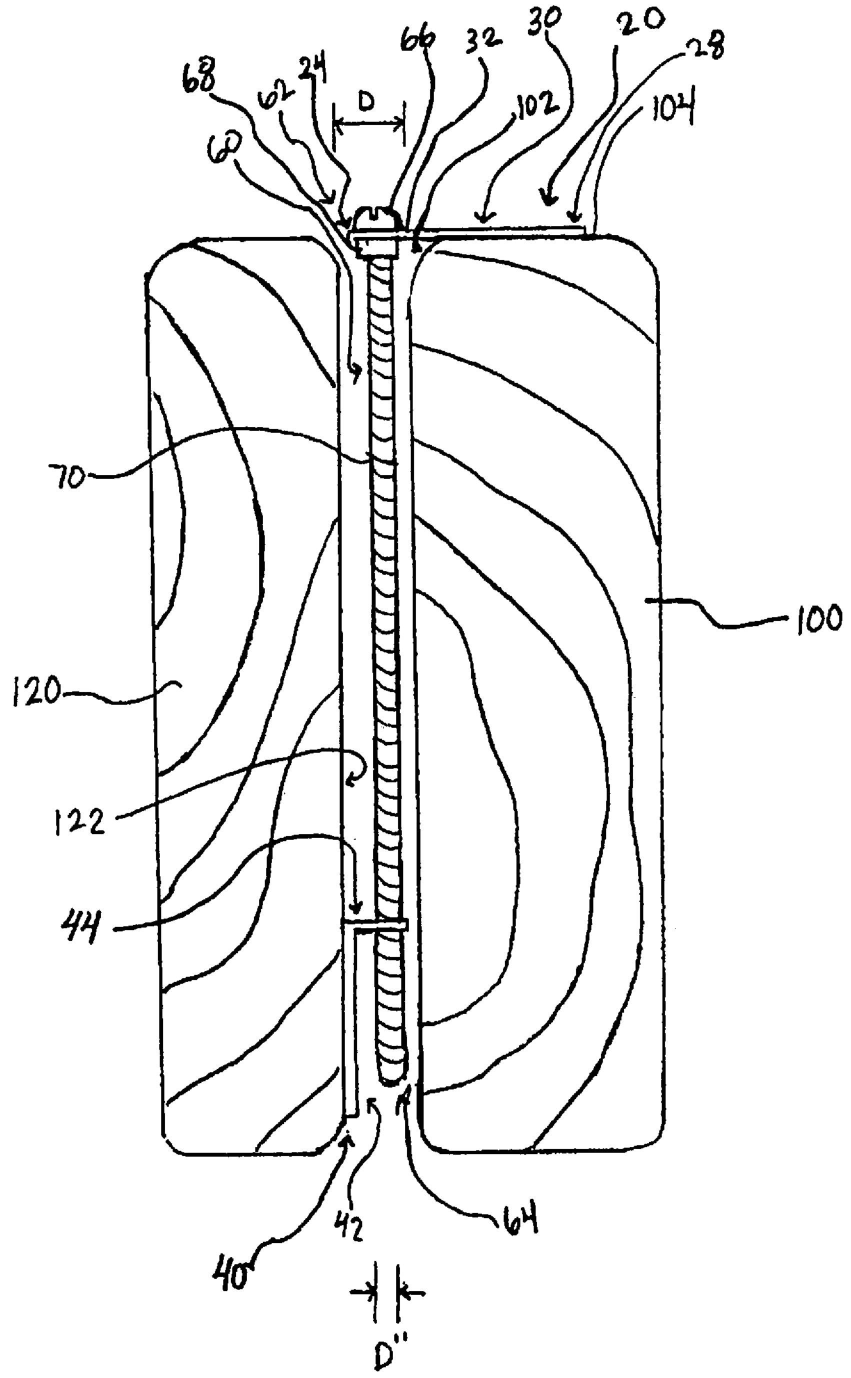
FIG. 10 is a cross-section view taken along line 10-10 in FIG. 9 of an embodiment of the invention.

Guide 20 may have any general shape including a rectangular prism shape, a washer shape or other similar shape. For example, as seen in FIGS. 8-10 guide 20 may be a rectangular prism that lies generally flat on a frame 100 (or a jamb 120 or other similar object), having a thickness T (FIG. 2), width W and length L (FIG. 3). Guide 20 may be attached to a single side 104 of frame 100, as shown in FIGS. 8-11. Side or inside face 104 is typically facing an inside of a building, for instance. When guide 20 is attached to the inside face 104 of frame 100, a portion of guide 20 may over-hang an edge 102 of frame 100. Guide 20 may be generally parallel to the side of frame 100, as in FIG. 10. As shown in FIG. 9, device 10 is used to adjust door or window jamb 120 within trimmer or frame 100. In one aspect jamb 120 is oriented generally vertically and between header 124 and sill plate 126.

Figure 5:
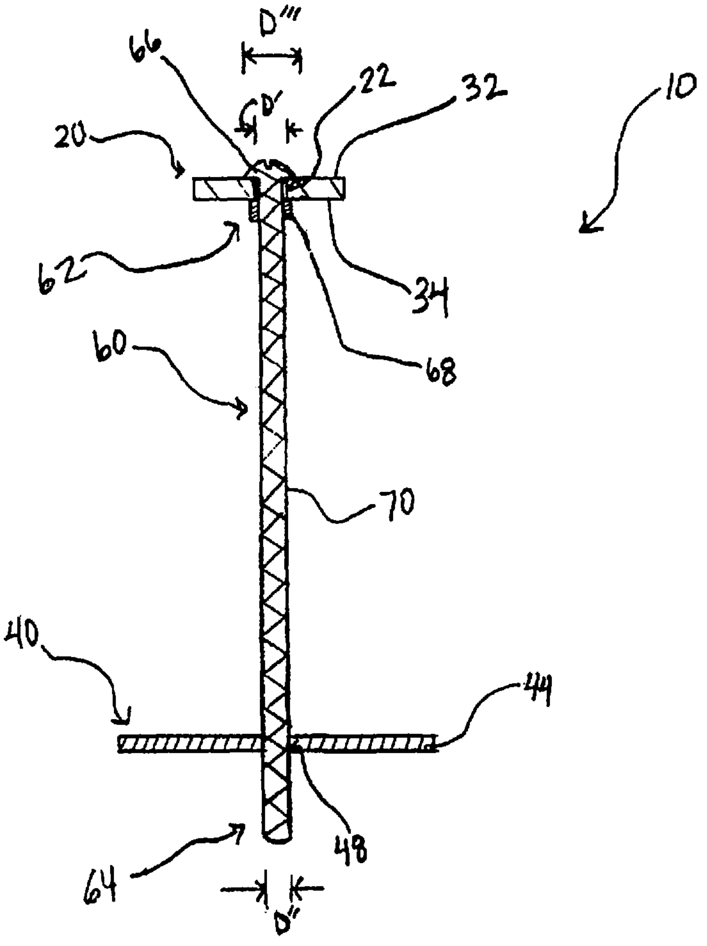
FIG. 5 is a cross-section view taken along line 5-5 in FIG. 4 of an embodiment of the invention.
Figure 6:
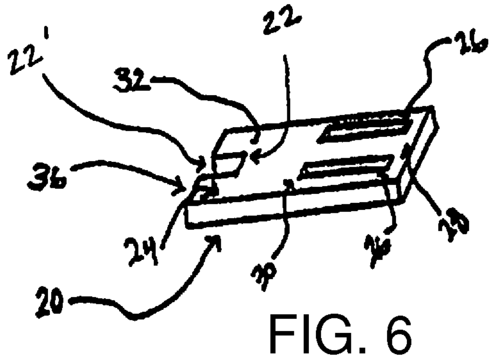
FIG. 6 is perspective view of a top feature of the embodiment of the invention in FIG. 1.
Figure 7:
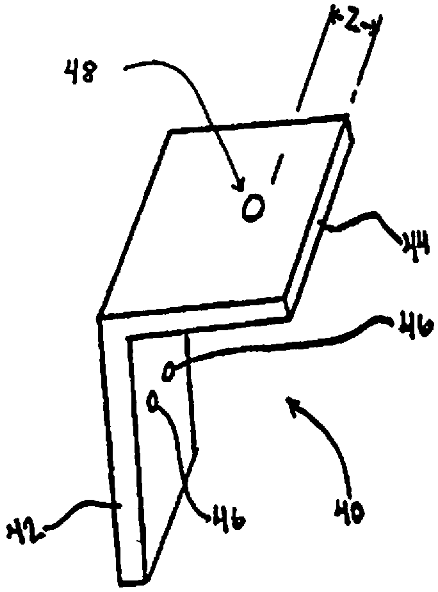
FIG. 7 is a perspective view of a bottom feature of the embodiment of the invention in FIG. 1.

Guide 20 may include guide receiver 22 for receiving a portion of connector 60, such that guide 20 may be oriented perpendicular to connector 60 after connector 60 is received. Guide receiver 22 may take on any shape that is slightly larger than a portion to be received by guide receiver 22 of connector 60. For example, as depicted in FIG. 5, guide receiver 22 has a width or diameter D' and connector 60 has a diameter D", where distance D" is less than distance D'. As seen in FIG. 6, guide receiver 22 may be a hole or notch or indentation in a first end 24 of guide 20. In one aspect, guide receiver 22 is an open-ended slot 22' running through the thickness of guide 20 as generally shown in FIG. 6. Typically guide 20 defines guide receiver 22. Regardless of shape or size, an open-ended slot, such as slot 22', may be considered a slot having an open portion corresponding to edge 36. It may be appreciated that open-ended slot 22' is an indentation or cut-out that runs through the thickness of guide 20. An open-ended slot 22' of guide receiver 22 allows for simple reception of connector 60 and allows for the easy use of an engaging piece 68 (further discussed below), whether engaging piece 68 is removably connected to connector 60 or is permanently connected to connector 60.

As mentioned above, guide receiver 22 may have any shape and size; for example, as shown in FIG. 5, guide receiver 22 may be slightly larger than connector 60 so as to be able to receive connector 60, yet still provide meaningful guidance of connector 60. Further, guide receiver 22 may take on any three-dimensional shape of a rectangle, triangle, circle, oval and the like, which has an open portion or side along edge 36. Guide receiver 22 may be four-sided; for example and as shown in FIG. 6, guide receiver 22 is an open-ended slot 22' having a first side, a second side perpendicular to the first side, a third side perpendicular to the second side and parallel to the first side, and a fourth side, which fourth side may be an open side that corresponds to edge 36, perpendicular to first and third sides and parallel to the second side. It may also be appreciated with reference to FIG. 6, that guide receiver 22 of guide 20 is a notch or open-ended slot. The notch or slot of guide receiver 22 may comprise a variety of shapes configured to receive connector 60 within guide 20 via a translating motion. Because guide receiver 22 may comprise an open slot, connector 60 may be received within guide 20 without having to insert a tip end of connector 60 into guide 20. The open slot arrangement may allow engaging piece 68 (See FIG. 4 and FIG. 5, for instance) to be connected to connector 60. Without an open slot 22, it would be difficult to provide a connector 60 with an engaging piece 68 (unless an engaging piece were inserted after connector 60 was inserted into guide 20). Engaging piece 68 together with head piece 66 allows for two-way adjustment of guide 20 upon rotation of connector.

Further, guide 20 may include at least one adjustment path 26. Adjustment path(s) 26 may comprise of a hole through guide 20 and the path(s) 26 may be centered at second end 28 of guide 20. Further, adjustment path 26 may have any shape and may be capable of receiving at least one attaching member 80. For example, as shown in FIGS. 1 and 3, guide 20 may comprise two adjustment paths 26 and an attaching member 80 in each adjustment path 26. Each adjustment path 26 may extend any distance along guide 20. For example, as seen in FIGS. 1, 3 and 6, adjustment paths 26 may extend from a second end 28 of guide 20 to a middle portion 30 of guide 20. Adjustment paths 26 do not necessarily have to be identical in size and shape, but may be the same size and shape. Adjustment path 26 allows for guide 20 to be adjusted with respect to side 104 of frame 100. The width W of guide 20 may be increased (and so may elongated paths 26) to allow a user an additional range of securing options for desired positioning of guide 20. Allowing a greater variety of positions allows a user to accommodate for different sizes of gaps that may exist between a window frame, for instance, and a window jamb. Guide 20 may be adjusted to any position with respect to frame 100, provided that guide receiver 22 (or at least a portion of guide receiver 22) hangs over an edge 102 of frame 100 so as to allow guide receiver 22 to receive connector 60. In one aspect, guide 20 may over hang edge 102 any distance less than or equal to a distance, D (shown in FIGS. 10 and 11), between extension jamb 120 and frame 100.

Figure 12:
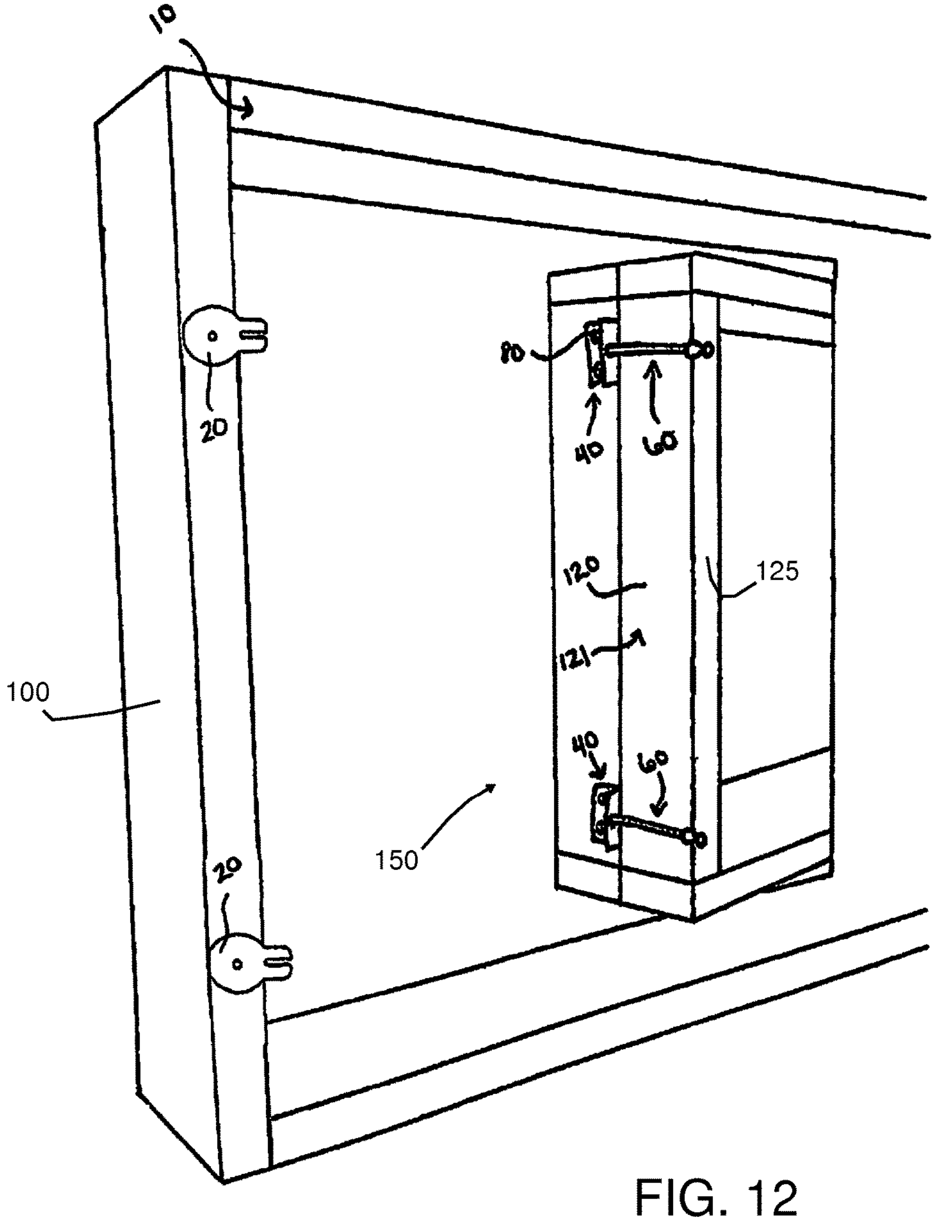
FIG. 12 is a perspective view of features of a further aspect of the present invention.
Figure 13:
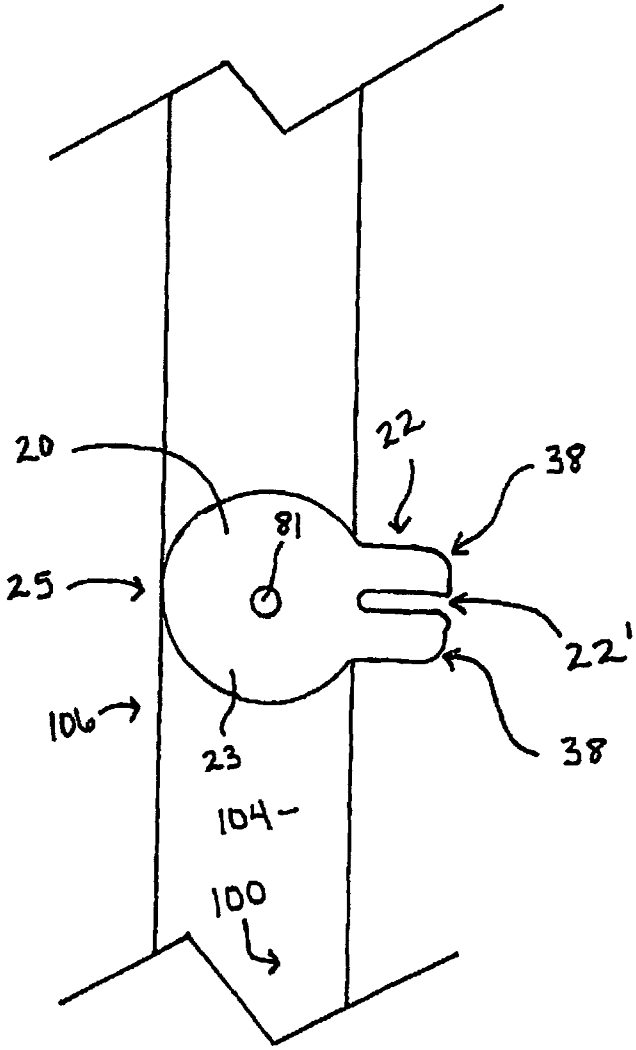
FIG. 13 is a side view of a feature of the aspect of the invention in FIG. 12.

In a further aspect guide 20 may include a washer or other configuration. As shown in FIGS. 12-13, guide 20 is in the form of a washer. In this aspect guide 20 includes a guide receiver 22 which is an elongated slot 22'. Slot 22' may be a cut-out from a standard washer (as in FIG. 13*a*), and is preferably metal but may be made of other material. Slot 22' may also be molded or created by a stamping operation, or other operation, to remove the material of receiver 22 to form the open slot. It may be appreciated that the dimensions of slot 22' may vary. Slot 22' may have a depth such that slot 22' approaches closer to, or farther from, a center hole of washer; or the slot 22' may have a width that receives a connector 60 where the connector 60 is relatively wide or narrow. In one aspect guide 20 also includes a screw hole 81, and in further aspect hole 81 has a countersunk or tapered opening so that the head of an attaching member 80, which may also be tapered, and when inserted through hole 81, will align flush with the top portion 23 of guide 20. It may be appreciated that top portion 23 of guide 20 may be a flat surface and may generally define a guide plane. Guide 20 may include more than one screw hole 81.

Figure 13A:
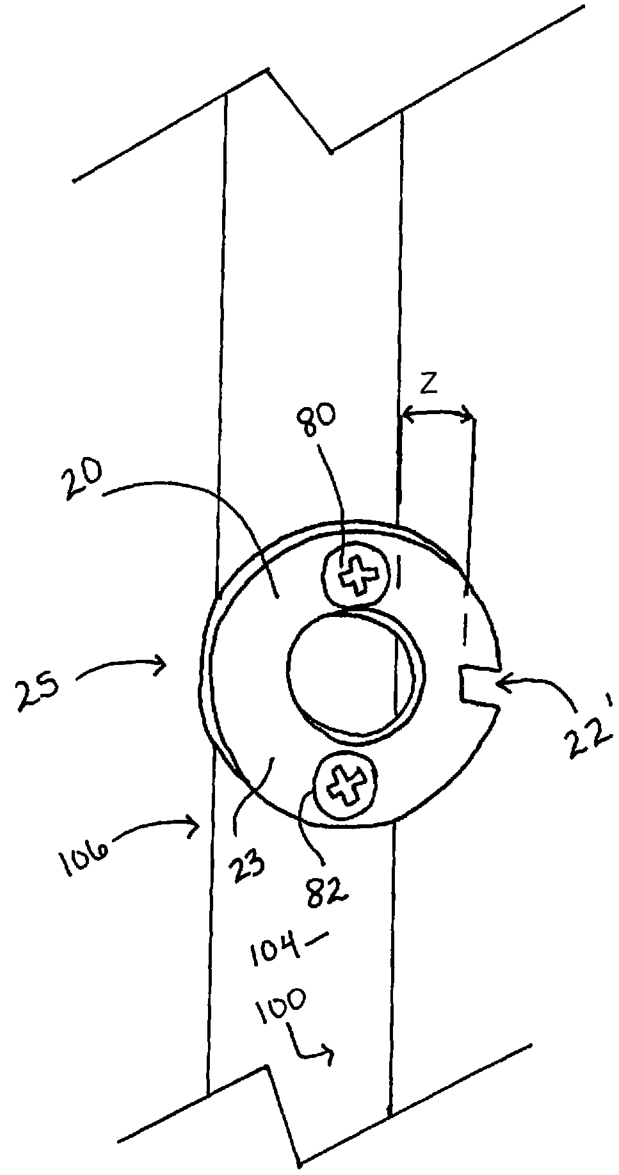
FIG. 13*a* is a side view of a feature of an alternative aspect of a feature of the invention.

When securing guide 20 to frame 100 it may be desired to countersink guide 20 so that top portion 23 of guide 20 lies flush, or in the same plane as, the side 104 of frame 100. Use of a washer as guide 20 accommodates convenient countersinking alignment since a standard drill bit may be used to prepare frame 100 with the countersunk area. A one inch, or 1-¼ inch, or other diameter drill bit may be used to prepare the region on frame 100 with a countersunk area for placement of guide 20. It may be appreciated that guide 20 may include a distal end 25 that is positioned opposite slot 22'. Distal end 25 may be positioned flush with frame back face 106, or may overhang back face 106 slightly (i.e., may be "off-set") as shown in FIG. 13*a*. A user may wish to position guide 20 on frame 100 with a slight off-set as in FIG. 13*a* so that attaching members 80 align closer toward a middle of frame 100 to lessen the likelihood that a member 80 would cause splitting of frame 100 (in the case where frame 100 is made of wood or other material). It may be appreciated that different sizes of guide 20 and washers 20 may be used to accommodate different thicknesses of frames 100 and different gaps that are present between frame 100 and extension jambs 120 of an object, such as window casing 121 (which may include an entire window) to be positioned and properly aligned within frame 100.

In a further aspect guide 20' may include a "washer-type" shape or modified washer or other configuration. As shown in FIGS. 13, 14A, 14B, and 16, guide 20' is in the form of a washer having tongs 38. Tongs 38 define a guide receiver 22 which is an elongated slot 22'. Tongs 38 extend from a washer-like base and in one aspect are integrally formed with the base. Slot 22' may also be molded or created by a stamping operation, or other operation, to remove the material of receiver 22 to form the open slot. It may be appreciated that the dimensions of slot 22' may vary. Slot 22' may have a depth such that slot 22' approaches closer to, or farther from, a center hole 81 of washer; or the slot 22' may have a width that receives a connector 60 where the connector 60 is relatively wide or narrow. Slot 22' as shown in FIG. 14*a* accommodates receiving piece 70 (See FIG. 14*b*) in a variety of positions since piece 70 may slide within slot 22' to a position closer to or further from screw hole 81 (while still being engaged within slot 22'). Particularly, neck 69 inserts into and slides within slot 22'. Slot 22' accommodates for greater variety of adjustment. In one aspect guide 20' also includes a screw hole 81, and in a further aspect hole 81 has a countersunk or tapered opening so that the head of an attaching member 80, which may also be tapered, and when inserted into hole 81, will align flush with the top portion 23 of guide 20. It may be appreciated that top portion 23 of guide 20' may be a flat surface and may generally define a guide plane.

Figure 20:
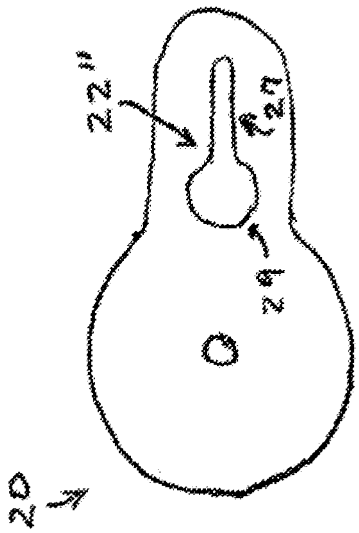
FIG. 20 is plan view of a further aspect of a feature of the invention.
Figure 19:
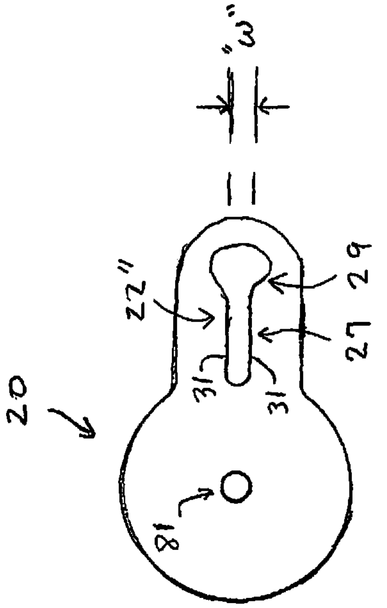
FIG. 19 is plan view of a further aspect of a feature of the invention.
Figure 22:
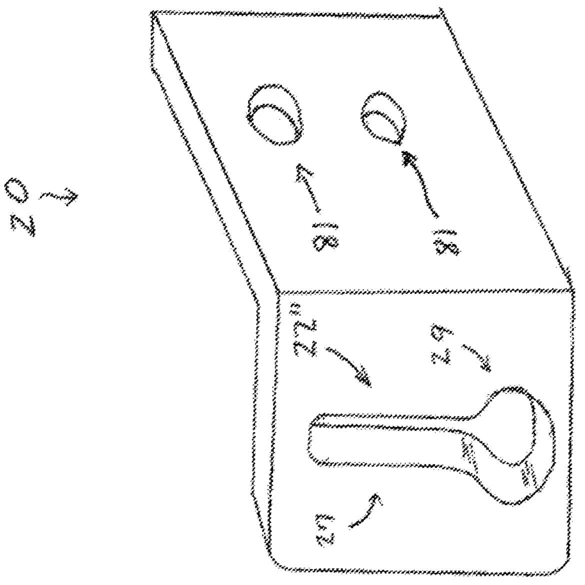
FIG. 22 is a perspective view of a further aspect of a feature of the invention.

With respect to FIG. 19, a further aspect of guide 20 is shown. In this aspect guide 20 includes a slot 22" which is bounded by a perimeter of guide 20. Guide 20 defines slot 22". In one aspect slot 22' includes a channel portion 27 having a width "w" and an insert hole 29 in communication with channel portion 27. Insert hole 29 is configured to receive a head of a fastener such as head 66. It may be appreciated that a fastener such as fastener 70 may be connected to guide 20 where head 66 of fastener 70 inserts into or through insert hole 29. Fastener 70 may slide into channel 27. For instance, a neck 69 of a fastener, such as a fastener 70, slides within or along channel 27. Thus, a bottom portion of head 66 will contact edges 31, 31 of channel 27 (See FIG. 19). Neck 69 may also contact edges 31, 31. It may be appreciated that on a back side of support 20 the engaging piece 68 at shoulder 68' may contact edges 31 of channel 27. It may be appreciated that a fastener 70 may be connected to support 20 by pushing head 66 into insert hole 29 and sliding neck 69 within channel 27. It may be appreciated that fastener 70 may spin within channel 27. FIG. 19 shows insert hole 29 positioned distally from hole 81 while channel 27 is proximal to hole 81. It may be appreciated that hole 29 may be positioned proximal to hole 81 while channel 27 is distal to hole 81 as shown in FIG. 20. It may be appreciated that other arrangements or configurations of slot 22" may also be provided at guide 20 for use in accordance with the present invention. While guide 20 in one instance shows a generally rounded configuration it may be appreciated that alternative shapes may also be used.

Figure 21:
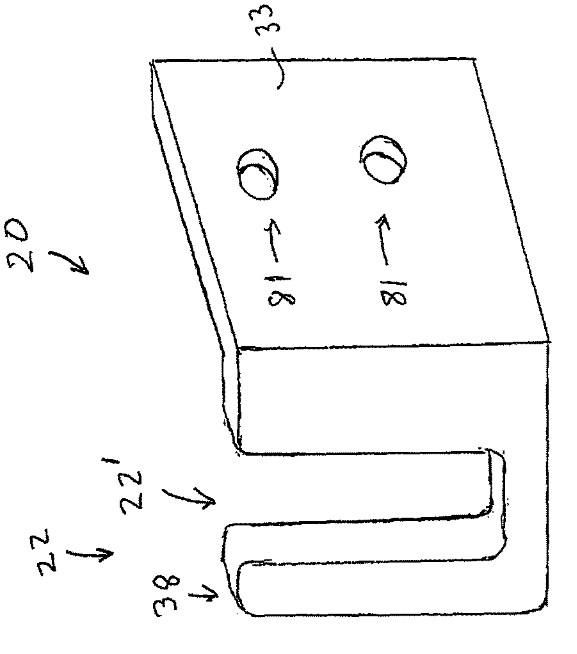
FIG. 21 is a perspective view of a further aspect of a feature of the invention.
Figure 24:
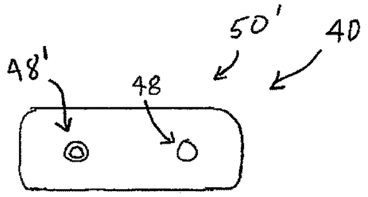
FIG. 24 is plan view of a further aspect of a feature of the invention.

In a further aspect guide 20 is configured to be secured to an inside of a frame 100. For instance, where a side 104 of a frame 100 has already been finished with paint or other finishing (or otherwise), it may be desired to place guide 20 between frame 100 and jamb 120. FIG. 21 shows a guide 20 configured to secure to an inside or facing side of frame 100. For instance, guide 20 may be angled so that guide receiver 22 is oriented between the frame 100 and jamb 120. In one aspect guide 20 has a base 33 with guide receiver 22 extending generally perpendicularly from base 33 as shown generally in FIG. 21. A screw may be inserted into screw hole 81 at base 33 to secure base 33 to a facing side of the frame 100 such that guide receiver 22 having a slot 22' projects into the gap between frame 100 and jamb 120. It may be appreciated that slot 22' receives connector 60 or elongated threaded piece 70. In a further aspect guide 20 includes a slot 22" which is bounded by a perimeter of guide 20. Guide 20 defines a channel 27 within or along which a neck 69 of a connector may slide. Insert hole 29 is configured to receive a head of a fastener such as head 66. It may be appreciated that a fastener such as fastener 70 may be connected to guide 20 where head 66 of fastener 70 inserts into or through insert hole 29. Fastener 70 may slide into channel 27. For instance, a neck 69 of a fastener, such as a fastener 70, slides within or along channel 27. Thus, a bottom portion of head 66 will contact edges 31, 31 of channel 27. Neck 69 may also contact edges 31, 31. It may be appreciated that on a back side of support 20 the engaging piece 68 at shoulder 68' may contact edges 31 of channel 27. It may be appreciated that a fastener 70 may be connected to support 20 by pushing head 66 into insert hole 29 and sliding neck 69 within channel 27. It may be appreciated that fastener 70 may spin within channel 27.

B. Support

Support 40 may have any general shape, for example, as seen in at least FIGS. 1, 4 and 7-10, 14*b*, 15*b*, support 40 may have a first portion 42 generally orthogonal to a second portion 44. First portion 42 and second portion 44 may be formed from a single piece of material (e.g., through a bending process—such as an L-shaped bracket) or each portion 42, 44 may be a separate piece of material rigidly connected. If portions 42, 44 of support 40 are made from separate pieces of material, the portions 42, 44 may be connected by any known connection means that creates a strong connection; for example, a welding means. Generally, first portion 42 may be any shape or size. First portion 42 may be any size; for example, as seen in FIGS. 2 and 10, first portion 42 may be a size (e.g., height H', length L') that fits within a perimeter of facing side 122 of extension jamb 120 (or a frame 100 or other similar object). It may be appreciated that second portion 42 includes an upper surface that generally defines a support plane. In one aspect support plane and guide plane may be oriented in a substantially parallel relationship.

In one aspect, portion 44 of support 40 may be of a generally planar dimension and may receive connector 60 in a generally perpendicular orientation with respect to portion 44 (i.e., when connector 60 is engaged with support 40, connector 60 is generally perpendicularly oriented with respect to support 40). Guide 20 may also be of a generally planer dimension and receive connector 60 in a generally perpendicular orientation with respect to guide 20 (i.e., when connector 60 is engaged with guide 20, connector 60 is generally perpendicularly oriented with respect to guide 20).

First portion 42 of support 40 may be attachable to extension jamb 120, or other portion, of a door or window or other insert object. First portion 42 may include at least one attaching hole 46 that may be able to receive an attaching member 80. Attaching hole 46 may be elongated to allow for desired adjustment of support 40. Attaching member 80 may be received through attaching hole 46 and inserted into extension jamb 120, for example. Attaching member(s) 80 may work to hold support 40 in place with respect to extension jamb 120.

Second portion 44 may be orthogonal with respect to first portion 42 and second portion may extend toward frame 100 from extension jamb 120. Generally, second portion 44 may be any shape and size; for example, second portion 42 may be any size (e.g., width W', length L', as seen in FIG. 3) where length L' is within the perimeter of facing side 122 and greater than diameter D", and width W' is less than or equal to distance D and greater than diameter D" (See FIG. 5). Further, W' (See FIG. 3) of second portion 44 may be minimized to allow for the smallest possible distance D (or the "gap") between extension jamb 120 and frame 100, as adjusted by adjusting the placement of guide 20 on side 104 of frame 100.

Second portion 44 may include a connector portion 48. Connector portion 48 may be such a shape and size as to be able to receive connector 60. For example, connector 60 may be a round threaded object and connector portion 48 may be a threaded hole defined in second portion 44 to receive connector 60 through rotational motion of connector 60. Connector portion 48 may be a threaded hole positioned a depth "Z" (See FIG. 7) from an edge of second portion 44. Open ended slot 22' may be cut within guide 20 such that a corresponding depth Z' exists between edge of frame 100 and bottom portion of slot 22' (See FIG. 13*a*). Where depth Z is substantially equal to depth Z', second portion 44 will abut an inside surface of frame 100 such that threaded hole 48 aligns with slot 22'. Thereafter connector 60 may be positioned in alignment between hole 48 and slot 22'. It may be appreciated that depth Z need not always equal depth Z for proper operation.

Figure 11:
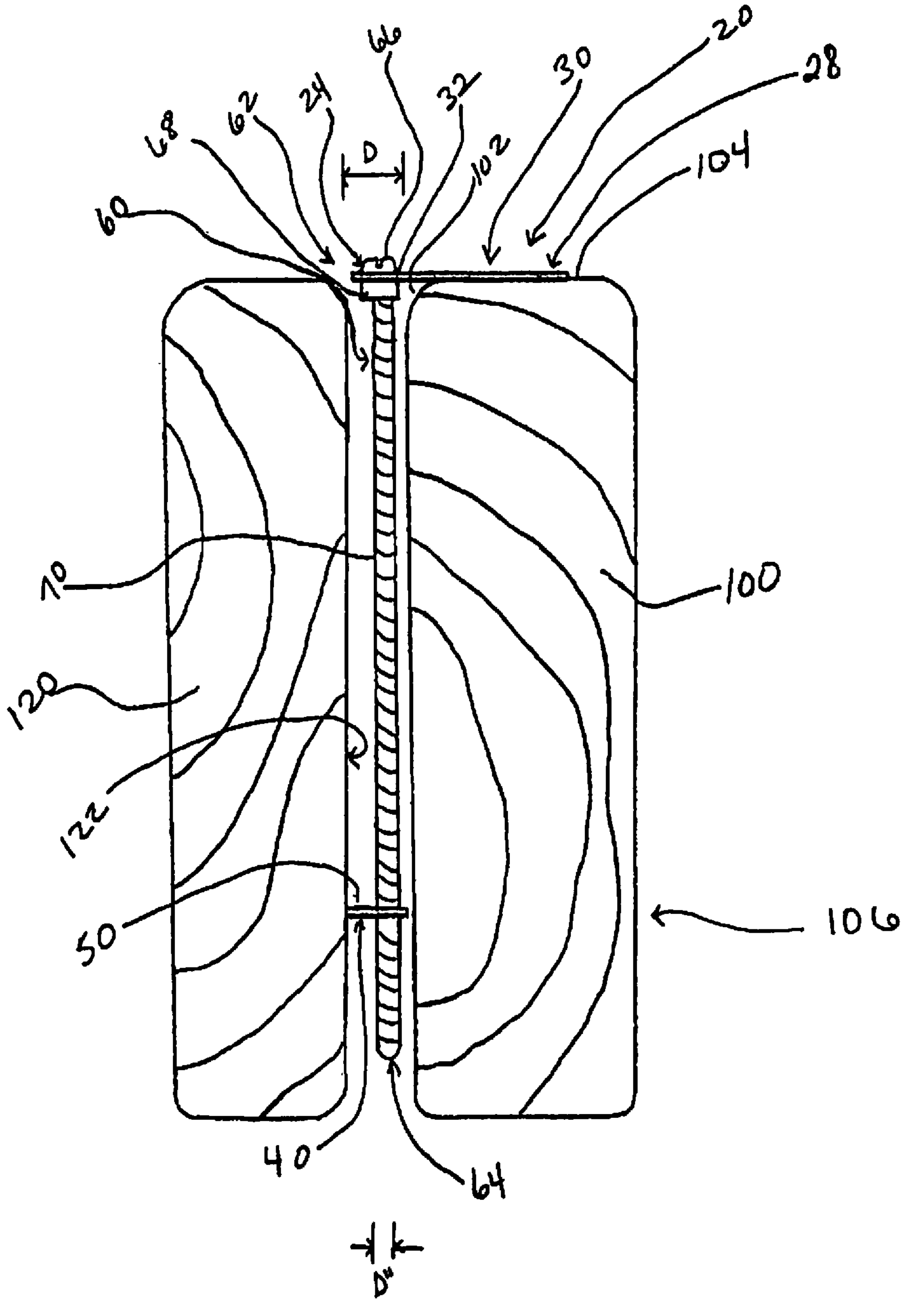
FIG. 11 is a cross-section view of a further aspect of the invention having support integrally connected to a facing side of an extension jamb.

In another aspect support 40 may comprise single portion support 50. As shown in FIG. 11, single portion support 50 is integrally connected to extension jamb 122. Single portion 50 may be inserted into, or attached to, a window or door or extension jamb or similar other object. For example, single portion support 50 may be inserted into a slot in an extension jamb 120. Single portion 50 may have any shape or size or dimensions; for example, a part of single portion 50 extending from extension jamb 120 may have similar or identical purposes, features and sizes as second portion 44, or of a nut 41 for instance. Single portion 50 may include a connector portion 48 such as a threaded hole.

In one aspect, single portion 50 may be integrally formed with, or on to, extension jamb 120. Where jamb 120 alternatively comprises a metal component of a window, single portion 50 may be a tab formed therein such that single portion 50 may be bent into position (or extends without bending) from jamb 120 to extend outwardly as generally depicted in FIG. 11. In similar fashion, second portion 42 may actually comprise a component of a window or like product (i.e., be integrally formed thereto) where single portion support 50 is a tab that is bent outward (or extends without bending) from portion 42 in order to receive fastener 60. The side of a window or other product may contain a series of single portion 50 which may be bent (or extend outward) to accommodate receipt of fastener 60. Different sized single portions 50 may be used to accommodate for different sizes of gaps having distance D that may exist between jamb 120 and frame 100. Different sized single portions 50 having different sized connector portions 48 to receive connectors 60 having a variety of diameters may also be used. A window or other product may be manufactured with a series of single portions supports 50 or tabs that can be selectively bent (or support portion 50 projects without bending) into orthogonal position to accommodate use under a variety of circumstances and with a variety of hardware parts. Such portions 50 may be of varying dimension to accommodate bending such that portions 50 extend from jamb 120 at varying lengths in order to match different gaps or distance D between frame and jamb 120. Portions 50 may include pre-threaded holes 48' or holes 48 may be self-tapping. It may be appreciated that single portion 50 may be embedded within the wood of a jamb 120. Single portion support 50 may also be clipped into or otherwise attached to jamb 120 to extend outward from jamb 120 to receive a fastener 60 or elongated threaded piece 70 within a connector portion 48 or threaded hole 48'.

Figure 14B:
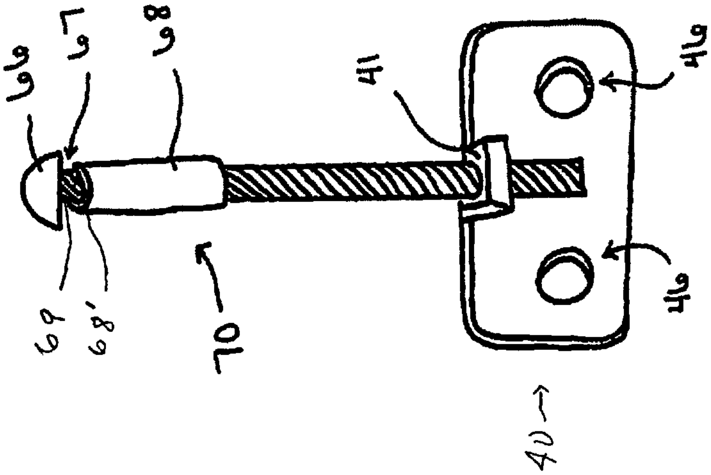
FIG. 14*b* is a perspective view of a further aspect of a feature of the invention.
Figure 14A:
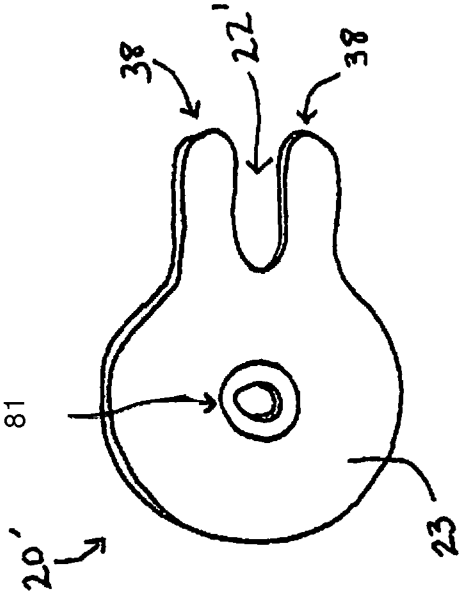
FIG. 14*a* is a perspective view of a further aspect of a feature of the invention.
Figure 15A:
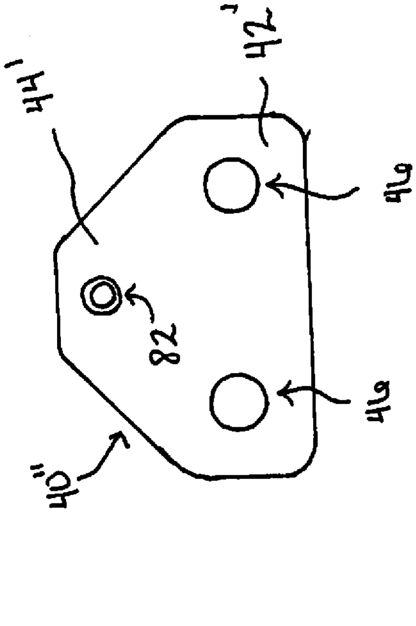
FIG. 15*a* is a plan view of a further aspect of a feature of the invention.
Figure 15B:
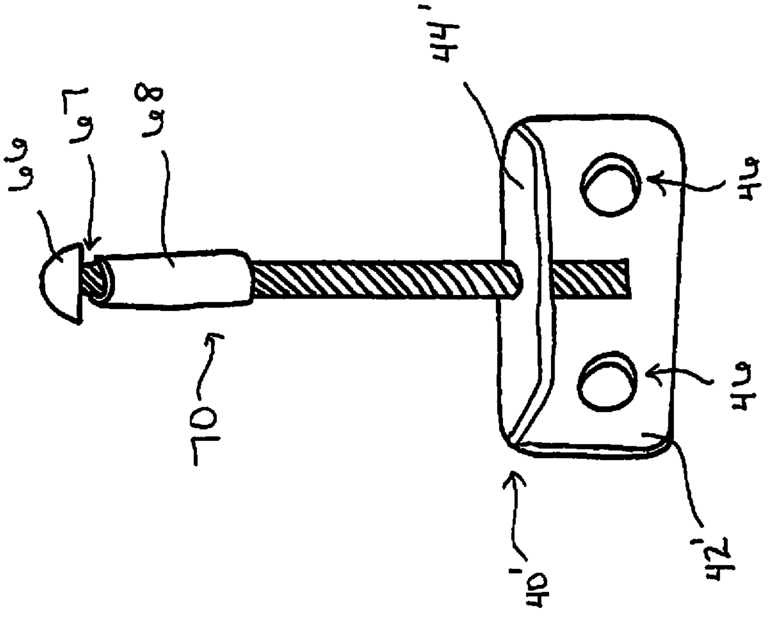
FIG. 15*b* is a perspective view of a further aspect of a feature of the invention.

In a further aspect support 40' may include a flat base with a threaded nut as generally shown in FIG. 14*b*. In yet a further aspect as shown in FIG. 15*a*, support 40" may include a first portion 42' with second portion 44'. Support 40" may start as a single flat piece as shown in FIG. 15*a*, and then second portion 44' may be bent into position as shown in FIG. 15*b*.

Figure 17:
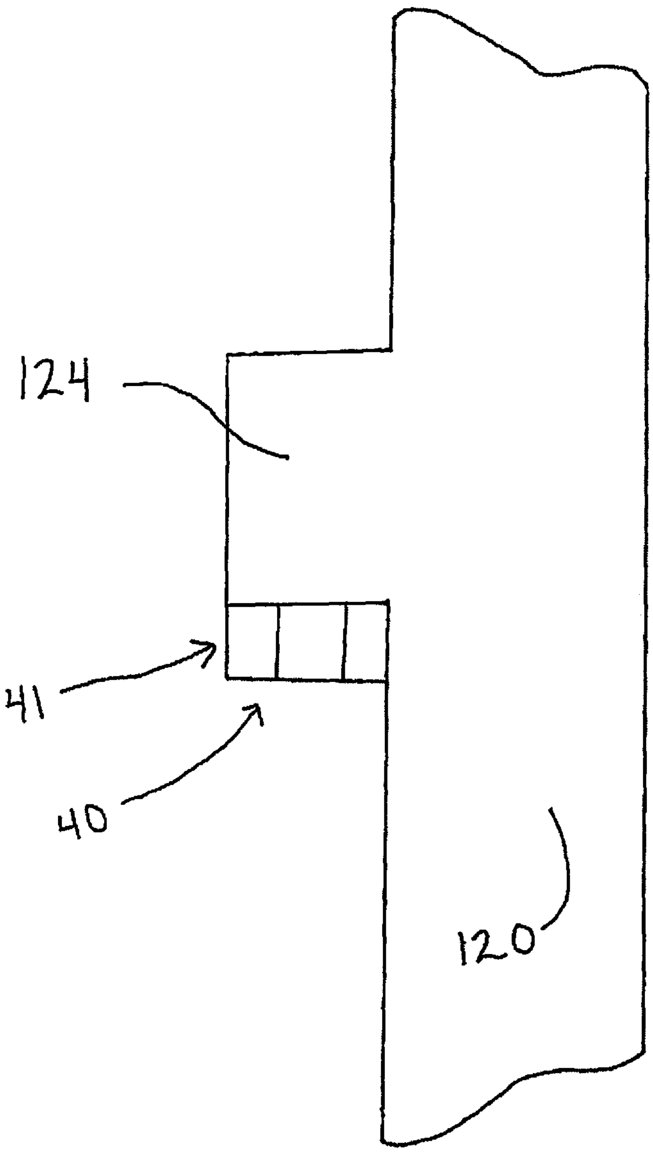
FIG. 17 is a partial plan view of a further feature of the present invention.

In a further aspect support 40 may comprise a hole or a threaded hole positioned into jamb 120. As shown in FIG. 17, jamb 120 includes support 40. Support 40 may comprise a threaded nut 41, or may comprise a hole or a threaded hole positioned in a jamb extension 124. Jamb extension 124 may be an extension attached to jamb 120 or may be integrally connected to jamb 120. In one aspect nut 41 may be glued or friction fit within extension 124. Alternatively jamb 120 defines threaded hole 82. Multiple supports 40 may be included on a jamb 120 during manufacture of jamb 120 or assembly of casing 121.

Figure 23:
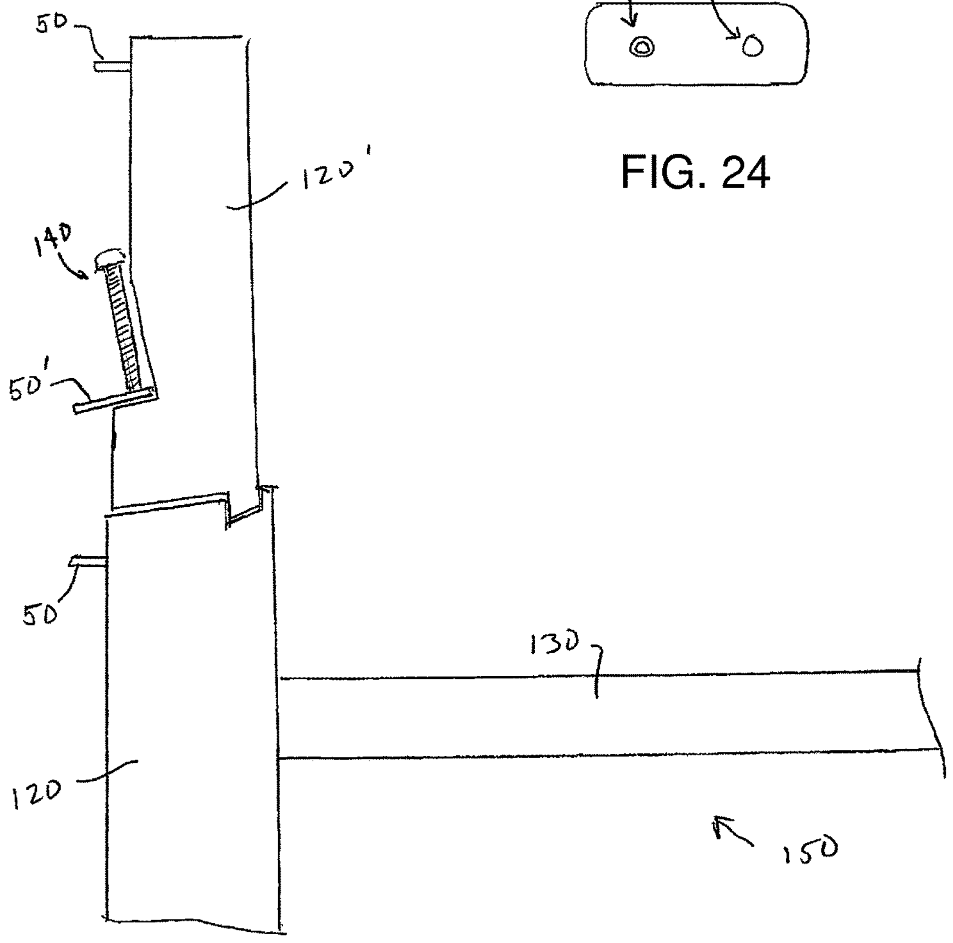
FIG. 23 is side view of a further aspect of a feature of the invention.

FIG. 23 shows a window segment comprising a jamb 120 having a glass 130 and a jamb extension portion 120'. Jamb extension portion 120' connects to and extends from jamb 120. In one aspect extension portion 120' is secured to jamb 120 by use of a fastener 140. In one aspect fastener 140 is a screw and inserts through extension portion 120' and into jamb 120 to secure portion 120' to jamb 120. It may be appreciated that an installer may use extension portion 120' to accommodate a desired securing of a window within a frame 100 and to accommodate a desired depth positioning of the window in relation to the frame or wall. In one aspect a single portion 50' may be attached to extension portion 120' as shown in FIG. 23 such that portion 50' may also be used as a support 40. Portion 50' may include a connector portion 48 to receive fastener 140 and may also include a threaded hole 48' to receive a connector 60. Alternatively, portion 50' may also be configured so that a connector 60 may self-tap into portion 50'. Alternatively, or in addition to portion 50', a single portion support 50 (or multiple single portion supports 50) may be oriented on jamb 120 (or jamb extension portion 120') to operate as a support 40 to receive connector 60.

C. Connector

Connector 60 may be utilized to connect guide 20 with support 40. Connector 60 may be any shape or size that is able to adjustably connect guide 20 with support 40. For example, connector 60 may comprise an elongated threaded piece 70, as seen in FIGS. 1, 2, 4, 5 and 8-11. Piece 70 may be partially or fully threaded. At a first end 62 of connector 60, connector 60 may engage guide receiver 22 of guide 20. First end 62 may include a rotation piece or head 66 and an engaging piece 68. Head 66 may be any shape and size. For example, as seen in FIG. 5, head 66 may have a diameter or width D'", that is greater than a width or diameter D' of guide receiver 22 so as to not allow rotation piece 66 to pass through guide receiver 22 or open slot 22'. In one instance head 66 may include a screw head or a nut head or other aspect allowing for rotation. Engaging piece 68 may be spaced from head 66 by any distance. For example, engaging piece 68 may be spaced from head 66 a distance greater than a thickness T of guide 20, as shown in FIG. 2. In one aspect both engaging piece 68 and head 66 are integrally formed as part of connector 60. Engaging piece 68 and/or head 66 may also be added to an elongated threaded piece 70 of connector 60, or combinations thereof may be integrally formed or later-added. An example of an added engaging piece 68 connected to connector 60 may include a set of nuts such as a double nut stop (i.e., two nuts that abut each other) that threadably engage the elongated threaded piece 70. It may be appreciated that head 66 and engaging piece 68 may both engage guide 20. In a further aspect, as shown in FIG. 14B and as may be appreciated with respect to FIG. 5, head 66 and engaging piece 68 define a gap 67. Guide 20, and in one aspect tongs 38, fit within gap 67. In one aspect gap 67 spans between head 66 and engaging piece 68 a distance that is greater than thickness T of guide 20. In one aspect, for instance, gap 67 may measure about 0.10 inches and thickness T may measure about 0.05 inches, or in other aspects gap 67 may measure about 0.090 inches or less and thickness T may measure about 0.060 inches or greater. Alternative dimension and distances may be used as needed or as desired. In operation, when a user rotates head 66 in a clockwise direction, head 66 abuts guide 20 and causes fastener to thread within screwhole 82, thereby causing jamb 120 to move toward head 66. Where head 66 is rotated counterclockwise, engaging piece 68 abuts guide 20, causing jamb 120 to adjust or move away from head 66. A user may thereby adjust the depth or position of jamb 120 relative to frame 100. It may be appreciated that jamb 120 may be adjusted such that it extends past frame 100 and inward to a room where a window is being position.

Connector 60 has a second end 64 that may threadably engage support 40 through threaded connector portion 48. When connector 60 is inserted in guide receiver 22 and is threadably engaging connector portion 48, rotational movement of connector 60 causes linear movement of support 40 with respect to guide 20. Further, head 66 and engaging piece 68 assist in engaging guide 20 by abutting top side 32 and bottom side 34 of guide 20, respectively. Such abutment and engagement of connector 60 with portion 48 allows for two-direction lateral movement of the extension jamb or frame depending on the direction of rotational movement of connector 60. Second end 64 may also be configured to be self-tapping within connector portion 48.

Figure 26:
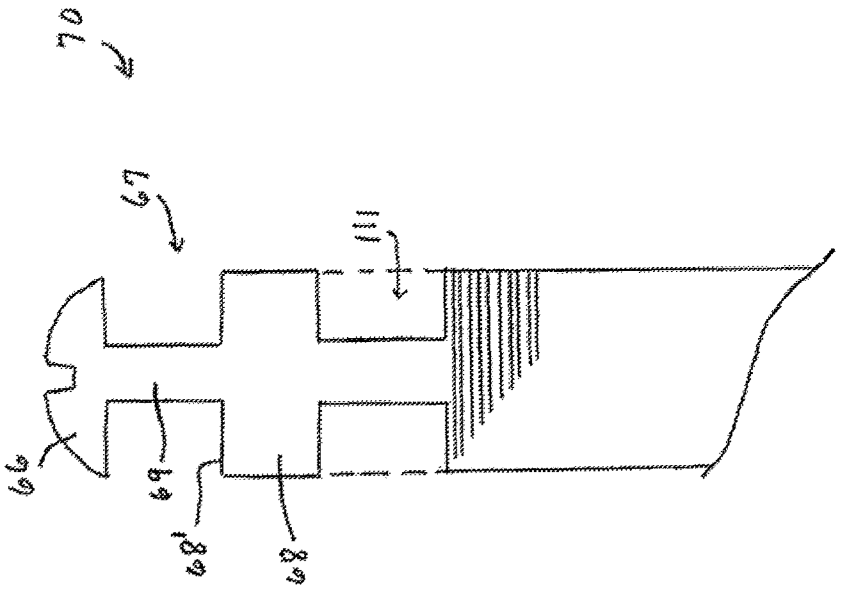
FIG. 26 is a partial side view of a further aspect of a feature of the invention.
Figure 25:
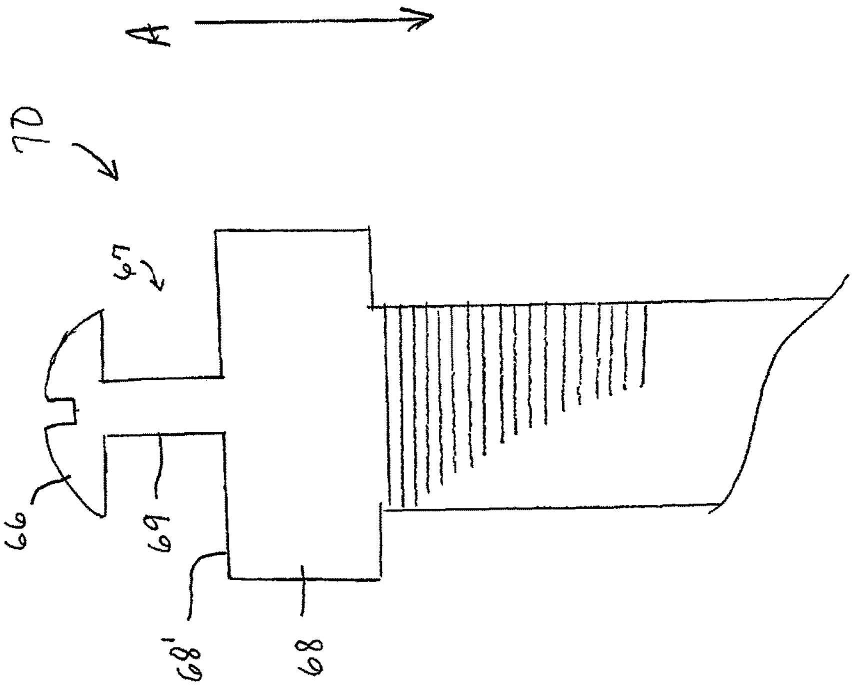
FIG. 25 is a partial side view of a further aspect of a feature of the invention.

In a further aspect as shown in FIG. 25 a connector 60 is shown having a head 66 and engaging piece 68. Neck 69 is configured to insert within a slot 22 of a guide 20. It may be appreciated that elongated threaded piece 70 may include threads as shown. Threads need not be presented at neck 69. It may be appreciated that engaging piece 68 may be integrally connected to piece 70 or may be an element that is screwed on upon threads and/or crimped onto connector 60. It may be appreciated that when neck 69 is positioned within slot 22, the head 66 will prevent fastener 70 from translational movement in the direction of arrow A and the engaging piece 68 will prevent fastener 70 from translational movement in the direction opposite arrow A. In a further aspect as shown in FIG. 26 a connector 60 is shown having an alternative configuration where head 66 has a diameter matching the diameter of engaging piece 68 which matches the diameter of the threaded connector portion. It may be appreciated in FIG. 26 that engaging piece 68 may define the threaded portion where gap 111 is filed with material and/or contains threads or is otherwise an extension of engaging piece 68 or of the threaded region. It may be appreciated that the diameter of neck 69 is less than the diameter of the threaded portion and of the engaging piece.

Figure 16:
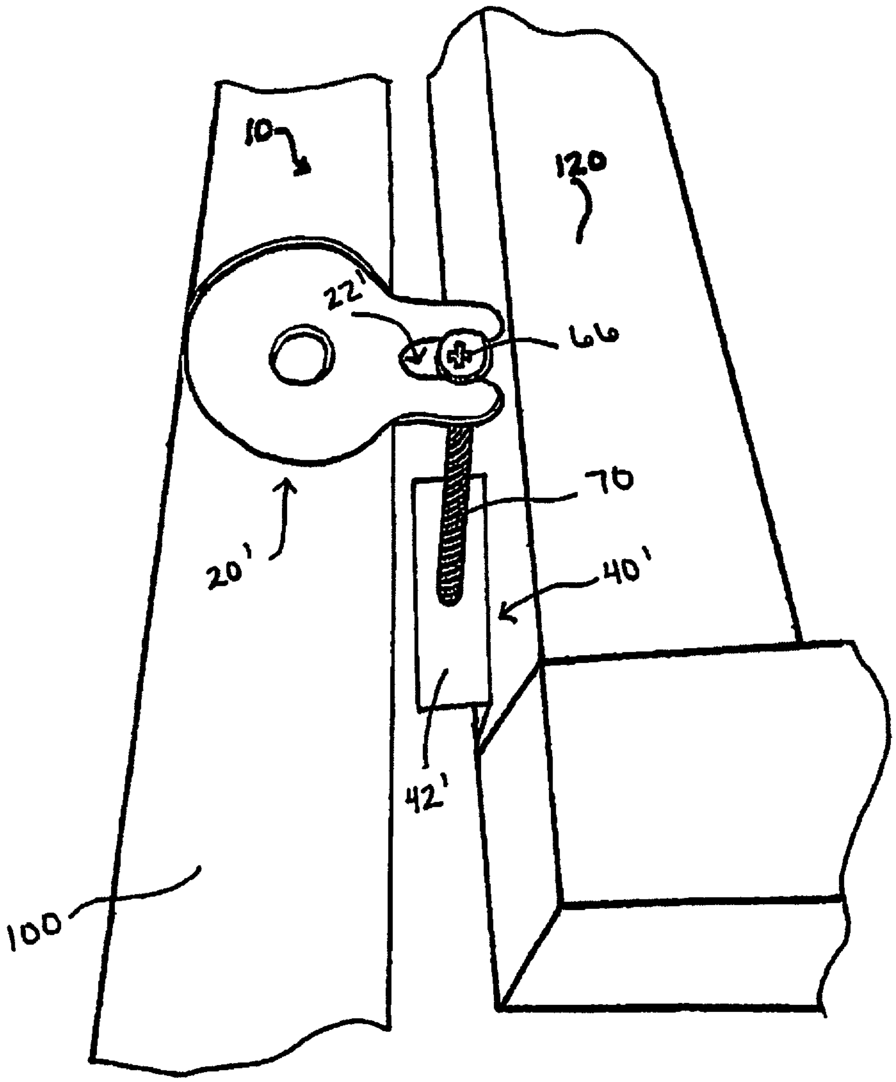
FIG. 16 is a partial perspective view of a further aspect of the invention.

In a further aspect, as shown in FIG. 16, guide 20' is positioned (preferably countersunk) on frame 100 with a fastener (such as a screw, not shown). Elongated threaded piece 70 having head 66 and engaging piece 68 is inserted within slot 22'. Support 40' is positioned on jamb 120 such that threaded hole 82 receives threaded piece 70. A user may rotate head 66 either clockwise or counter-clockwise to adjust the position of jamb 120 relative to frame 100. It may be appreciated that elongated slot 22' accommodates to receive piece 70 where a gap having distance "D" varies between jamb 120 and frame 100. It may also be appreciated that guide 20' is configured for rotation about threaded hole 82 so that tongs 38 may project upward or downward as preferred or in order for slot 22' to align with and receive fastener 70.

D. Operation of Adjustment Device

In operation of adjuster 10, support 40 may be attached to extension jamb 120; guide 20 may be attached to frame 100; and connector 60 may slidably (e.g., through horizontal or vertical or both horizontal and vertical movement) engage guide 20 and threadably engage support 40. Support 40 may be attached to facing side 122 of extension jamb 120 by inserting attaching member(s) 80 (i.e., screws) through attaching hole(s) 46 and inserting attaching member(s) 80 into facing side 122 or by directly inserting support 40 into facing side 122. Alternatively, single member 50 may be bent or projects into perpendicular position to accommodate insertion of connector 60. Guide 20 may be attached to side 104 of frame 100 by inserting attaching members 80 through adjustment paths 26 (or screw holes 82) and into side 104, at a desired location within adjustment paths 26 and side 104. Prior to tightening attaching members 80, which are to engage guide 20, guide 20 may be desirably aligned with respect to edge 102, support 40 and connector 60. After guide 20 is properly aligned, attaching members 80 may be tightened into side 104. In one aspect guide 20 is positioned such that slot or receiver 22 overhangs edge 102 and in a further aspect receiver 22 aligns with threaded connector portion 48. Alternatively, a drill-bit or other tool may be used to prepare a counter-sunk region to receive washer-like guide 20. In one aspect, guide 20 may be countersunk by preparing frame 100 with a 1¼ inch drill bit at a depth of about ⅛ inches. Countersinking also provides a pilot hole for insertion of a fastener through screw hole 81.

After or before, or both, guide 20 is attached to frame 100 and support 40 is attached in a desired allocation to extension jamb 120, support 40 may be aligned with guide 20. Support 40 may be considered to be in alignment with guide 20 when guide 20 is generally parallel to second portion 44 or single portion 50 of support 40 and when guide receiver 22, and particularly slot 22' of guide 20 overlaps or aligns with connection portion 48 of support 40. FIG. 5 depicts one instance where guide receiver 22 overlaps or aligns with connection portion 48.

After support 40 and guide 20 are attached to an extension jamb 120 and frame 100, respectively, and aligned, connector 60 may then be used to linearly adjust support 40 with respect to guide 20. Connector 60 may be slid into guide receiver 22, where a portion of the elongated threaded (or unthreaded portion) piece 70 located between rotation piece 66 and engaging piece 68, i.e., the neck 69, is engaged with slot 22'. As may be appreciated with respect to FIGS. 5 and 12-16, when neck 69 is inserted into guide 20, head 66 may abut a top side 32 of guide 20 and engaging piece 68 may abut a bottom side 34 of guide 20, also as shown in FIG. 2. While FIG. 2 shows head 66 and engaging piece 68 simultaneously abutting guide 20, there is no requirement that both engaging piece 68 and head 66 abut guide 20 simultaneously.

After sliding connector 60 into guide 20, or before, connector 60 may threadably engage connector portion 48 of support 40. It is often convenient for connector 60 to be threaded within threaded hole 48 prior to engagement within slot 22'. When connector 60 is aligned with connector portion 48, head 66 of connector 60 may be rotated by a tool or by hand so that connector 60 threadably engages connector portion 48. Such rotation, in a first direction, of connector 60 and the engagement with support 40, causes linear movement of support 40 and extension jamb 120 toward guide 20. Rotation of head 66 and connector 60 in a second direction, opposite the first direction, causes linear movement of support 40 and extension jamb 120 away from guide 20. Such rotational movement transferred to linear movement may allow for precise stable adjustment of windows or doors with respect to the frames to which they are inserted. This operation may allow for convenient in/out adjustments of the windows within a frame and reduces the problem of guesswork and improves speed and accuracy of construction. Thus, a window or a door or other object may be positioned so as to have an interior or exterior side flush with an exterior or interior side of a frame, or the window or door or other object may be set to have a recess of desired depth with respect to an interior or exterior of the frame. It may be appreciated that jamb 120 may be positioned with respect to frame 100 such that jamb 120 projects outward (i.e., into a room) a distance of about ½" (more or less as desired) to accommodate for sheeting and/or trim to be applied to frame 100.

Adjuster 10 may be used by itself or in combination (e.g., FIGS. 8 and 9, 12 and 16) with other adjusters 10 to adjust the placement of a window or door or other object(s) with respect to a frame, as described above. In one similar method of use, at least two adjusters 10 may be used to align the window or door with a frame. In an embodiment, when two adjusters are used, a first adjuster 10 may be placed on a first vertical jamb of a window and a second adjuster 10 may be placed on a second vertical jamb of the window.

The first vertical jamb may be spaced a distance from the second vertical jamb. Further, the first vertical jamb may be substantially parallel to the second vertical jamb. Of course, any number of adjuster may be used, as desired. The use of multiple adjusters 10 on multiple parallel vertical jambs may allow for each side of a door or window or object to be aligned at the same location with respect to a frame.

Figure 18:
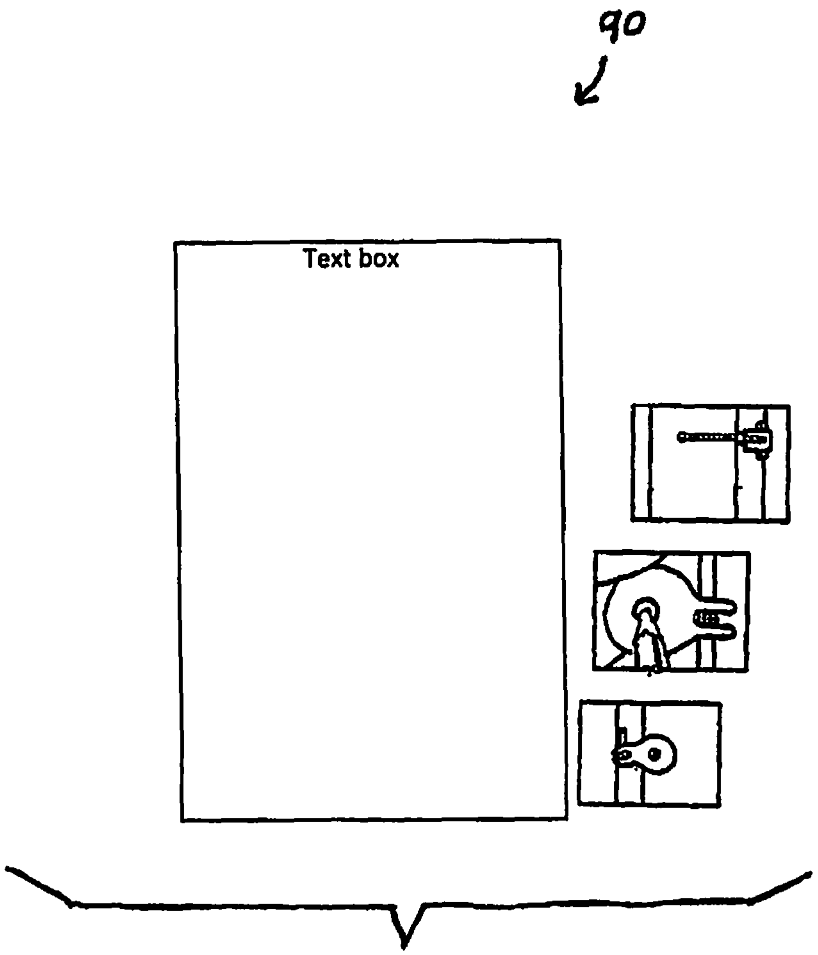
FIG. 18 is a view of an instruction sheet for providing instruction for use in association with use or installation of an aspect of the present invention.

FIG. 18 shows instructions 90 that may be used in association with or as part of the present invention. In one aspect the instructions provide the following: "Installation Instructions:"

Step 1 (corresponding to the adjacent image in FIG. 18)

Prior to window installation, 4 jamb brackets or supports 40 are mounted to the window jamb 120 on the upper and lower side jambs 120 (See FIG. 12, for instance). In one aspect, use two fasteners 80 or ¾" screws to secure the jamb brackets (i.e., supports 40) to the jamb 120. With the adjustment screw-head (i.e., head 66 of connector 60) oriented towards the jamb face 125), center the ¾" mounting screws 80 approximately 2½" from the jamb face 125 (assuming a connector 60 having a length of about three inches; this allows connector 60 to be threaded within support 40 while head 66 extends slightly past jamb face 125). It may be appreciated that different positioning may be used where different lengths of connector 60 are used. If the jamb thickness (i.e., thickness of the wood at jamb 120) is less than ¾", shorter screws would be used. If longer or shorter adjustment screws are desired, the placement of the support on a jamb may vary.

Step 2

Install window to manufacturer's specifications.

Step 3 (corresponding to the adjacent image in FIG. 18)

Align trimmer plate slot (i.e., guide slot 22) over adjustment screw-head 66 and mark center screw hole 81 within the guide 20. Make sure your spade drill bit will not hit the adjustment screw (you may need to turn in). Drill 1¼" hole ⅛" deep. Other sizes and depths may be used depending on the configuration and dimension of guide 20. Turn adjustment screw (i.e., connector 60 to alter the depth of connector head 66) to accept trimmer plate slot (i.e., accept or engage with the slot 22 of guide 20) and fasten the guide 20 to the frame with screw provided (i.e., such as securing a screw through guide, such as through hole 81). Adjust your window to a desired distance (i.e. adjust the jamb 120 to a desired depth with respect to frame 100. Such adjustment should be set prior to addition of foam insulation which would also set the jamb in position with respect to the frame.

As may be appreciated from the original disclosure and with respect to FIG. 1-11 and FIGS. 12-18, and FIGS. 19-26, in an operational aspect, a method of the invention includes engaging fastener 60 with support 40 by inserting a threaded end of fastener 60 into the support 40 where the support has been previously positioned on or provided at a jamb 120 of a window 150 or a door. Thereafter, the fastener 60 is engaged with the guide 20 by inserting the neck 69 of the fastener 60 into the slot 22 of the guide. A user may then rotate the fastener 60 by rotating the head 66 which in turn causes the threads of the fastener 60 to adjust within the support 40 which in turn causes jamb 120 to move linearly. It may be appreciated that in one aspect a step of securing the guide 20 to the frame 100 occurs after securing the fastener 60 to the support 40. In one aspect the step of inserting the neck 69 into the slot 22 occurs after inserting the connector 60 into the jamb 120. This allows a user to make easier positioning of the components for use.

As may be appreciated with FIG. 10, a clockwise rotation of connector 60 will cause jamb 120 to move upward where support 40 moves closer to guide 20. A counterclockwise rotation of connector 60 will cause jamb 120 to move downward where support 40 moves away from guide 20. It may be appreciated that where the threads of connector 60 are reversed, a corresponding reversal of the above direction and relative movements of support 40 and guide 20 will be realized.

In one aspect the window containing the connected fastener 60 may be positioned adjacent the frame 100 in order to measure the positioning for mounting guide 20. This will reduce the guesswork (or special skill or trial and error) otherwise required to position guide 20 in a desired location upon frame 20. Particularly, a user may position faster 60 adjacent frame 100 then slide guide 20 and slot 22 upon neck 69 of fastener 60, mark a center hole of guide 20 onto the frame 100, remove the guide from neck 29, counter-sink and then secure guide 20 to frame 100 while positioning slot 22 into gap 67. In this manner head 66 is exposed and may be rotated which in turn causes jamb 120 to translate inward or outward. In a case where connector 60 is self-tapping into jamb 120, a user may desire to assure deep rotation of connector 60 into jamb 120 to form threads sufficiently strong to resist stripping when connector 60 is rotated with neck 69 positioned in slot 22. It may be appreciated that plastic components (or components made of other materials) may be used in keeping with the scope of the present invention.

In a further aspect the invention includes placing the guide 20 on the jamb 100 and connecting the connector 60 to the frame 100 (and or to a support 40 connected to the frame 100).

It may be appreciated that adjustment of threaded connector 60 results in the threads causing small translational adjustments of the jamb 120 with respect to the frame 100. Such small adjustments allow a user to precisely set the window in a desired position with respect to a frame.

With reference to at least FIGS. 1-11 the invention includes a window 150 having a jamb 120 equipped with a hole or screw hole 81 configured to receive a connector at a position between the jamb 120 and a frame 100 to which the window 150 will be mounted. A connector 60 is inserted into the hole 81 (or a hole 81 is created by a self-tapping screw being inserted into a single portion support 50') and projects such that a neck 69 of the connector, which neck 69 is positioned between a head 66 of the connector 60 and an engaging piece 68 of the connector, is inserted into a slot 22 of a guide 20 which is connected to the frame 100. As provided in and as may be appreciated by the original disclosure of the invention, because the neck 69 of the connector 60 is positioned within the slot 22, and the head 66 and engaging piece 68 prevent translational motion of the connector 60 (i.e., in and out of the window opening) when the connector 60 is rotated, the turning threads of the connector within the hole 81 cause the jamb to move translationally (i.e., in and/or out) with respect to the frame on which the guide 20 is positioned.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular ADJUSTMENT DEVICE, SYSTEM AND METHODS as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A method of adjusting a window with respect to a frame where a threaded connector is threaded within a threaded hole of a support, the support connected to the a jamb of the window, the frame including a guide, said method comprising:

inserting the threaded connector into the guide after the threaded connector is positioned within the threaded hole of the support;

rotating the connector about a central longitudinal axis of the connector to change a distance between the guide and the window where clockwise rotation of the connector reduces or increases the distance between the guide and the window and where counterclockwise rotation increases or reduces the distance between the guide and the window; and maintaining the frame stationary while the jamb adjusts due to rotation of the connector; said inserting the threaded connector into the guide includes inserting a neck of the connector into a slot of the guide where the neck separates a head of the connector from an engaging piece of the connector, the neck having a diameter less than a diameter of the head and less than a diameter of the engaging piece.

2. The method of claim 1 where the head is integrally connected to the connector at a terminal end of the connector, the head configured such that it cannot pass through the slot.

3. The method of claim 1 where a threaded connector is inserted into a threaded hole at each of four corners of the window, the method further including rotating each of the threaded connectors to position the window as desired within the frame which surrounds the window.

4. A method of adjusting a window with respect to a frame where an elongated threaded connector is threaded within a threaded hole of a support, the support connected to the a jamb of the window, the frame including a guide, said method comprising:

inserting the threaded connector into the guide after the threaded connector is positioned within the threaded hole of the support;

rotating the connector about a central longitudinal axis of the connector to change a distance between the guide and the window where clockwise rotation of the connector reduces or increases the distance between the guide and the window and where counterclockwise rotation increases or reduces the distance between the guide and the window; and maintaining the frame stationary while the jamb adjusts due to rotation of the connector; said step of inserting the connector into the guide including sliding the connector in a direction transverse the longitudinal axis of the connector.

5. A method of adjusting a jamb of a window with respect to a frame where a threaded connector is threaded within a threaded hole of the jamb and the frame includes a guide connected to an inside face of the frame, said method comprising:

positioning the threaded connector within the threaded hole;

aligning the jamb with the frame;

positioning the guide against the inside face of the frame;

inserting the threaded connector into a slot of the guide after the threaded connector is positioned within the threaded hole;

connecting the guide to the inside face of the frame; and rotating the connector about a central longitudinal axis of the connector to change a distance between the guide and the jamb where clockwise rotation of the connector reduces or increases the distance between the guide and the jamb and where counterclockwise rotation increases or reduces the distance between the guide and the jamb.

6. The method of claim 5 further comprising:

marking the position of the guide after said step of positioning the guide against the inside face of the frame;

removing the guide prior to said connecting the guide to the inside face of the frame; and preparing a counter-sink hole in the frame to receive the guide prior to said connecting the guide to the inside face of the frame.

7. The method of claim 6 where said connecting the guide includes securing a screw through the guide, said method further comprising adjusting the guide to align a neck of the connector to insert within the slot.

8. An adjusting device for adjusting a window with respect to a frame, said device comprising:

a guide having a slot and configured to connect to the frame;

a support configured to connect to a jamb of the window and independent of said guide; and an elongated threaded connector having a head rigidly connected at a terminal first end of said connector, an engaging piece where said head and said engaging piece are separated by a neck, the neck having a diameter less than a diameter of the head and less than a diameter of the engaging piece, and a second end of said connector configured to connect to said support, said guide configured such that said neck is capable of being inserted into the slot of said guide after said connector is connected to said support and such that rotation of said connector about a central longitudinal axis of said connector changes a distance between said guide and said support while the frame remains stationary and while a distance between said rotation piece and said engaging piece remains constant.

9. The device of claim 8 where said support is connected to the jamb and said guide is connected to the frame.

10. The device of claim 9 where said guide has tongs defining the slot.

11. The device of claim 10 where said slot of said guide includes a channel and said guide further includes an insert hole in communication with said channel and configured to allow said head to pass through said insert hole.

12. The device of claim 9 where said support is integrally connected to said jamb.

13. The device of claim 8 where said connector threadably engages said support at a threaded hole.

14. A method of adjusting a window jamb with respect to a frame comprising utilizing the device of claim 8.

15. The method of claim 5 where the jamb includes a support connected to the jamb, the support defining the threaded hole, said step further comprising rotating the connector about a central longitudinal axis of the connector to change a distance between the guide and the support where clockwise rotation of the connector reduces or increases the distance between the guide and the support and where counterclockwise rotation increases or reduces the distance between the guide and the support.

16. The device of claim 8 where said head is integrally connected at said terminal first end of said connector.

17. The device of claim 8 where said engaging piece is rigidly connected to said threaded connector.

18. The device of claim 8 where said engaging piece is integrally connected to said threaded connector.

* * * * *